United States Patent
Puente Pestaña et al.

(10) Patent No.: US 12,348,425 B2
(45) Date of Patent: Jul. 1, 2025

(54) NETWORK BLOCKING OF USER EQUIPMENT APPLICATION

(71) Applicant: Telefonaktiebolaget LM Ericsson (publ), Stockholm (SE)

(72) Inventors: Miguel Angel Puente Pestaña, Madrid (ES); Rodrigo Alvarez Dominguez, Madrid (ES); Ruth Pallares Del Egido, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 413 days.

(21) Appl. No.: 18/002,776

(22) PCT Filed: Jul. 27, 2020

(86) PCT No.: PCT/EP2020/071137
§ 371 (c)(1),
(2) Date: Dec. 21, 2022

(87) PCT Pub. No.: WO2021/259509
PCT Pub. Date: Dec. 30, 2021

(65) Prior Publication Data
US 2023/0262003 A1      Aug. 17, 2023

(30) Foreign Application Priority Data

Jun. 25, 2020     (EP) ................................ 20382562

(51) Int. Cl.
*H04L 47/2475*     (2022.01)
*H04L 47/80*       (2022.01)
*H04W 48/02*       (2009.01)

(52) U.S. Cl.
CPC .......... *H04L 47/2475* (2013.01); *H04L 47/80* (2013.01); *H04W 48/02* (2013.01)

(58) Field of Classification Search
None
See application file for complete search history.

(56) References Cited

U.S. PATENT DOCUMENTS 10,904,250 B2 *   1/2021  Larish ................. H04L 63/0876
2018/0027415 A1   1/2018  Powers et al.
(Continued)

FOREIGN PATENT DOCUMENTS

WO    2019184680 A1    10/2019
WO    2019201457 A1    10/2019
(Continued)

OTHER PUBLICATIONS

Japanese Office Action and English Summary dated Jan. 23, 2024 for Application No. 2022-579689, consisting of 12 pages.
(Continued)

*Primary Examiner* — Hong S Cho
(74) *Attorney, Agent, or Firm* — Weisberg I.P. Law, P.A.

(57) ABSTRACT

Blocking use of an application on a user equipment through a cellular network. One method is a method for operating a network exposure entity in a cellular network, the cellular network being operable to transmit at least a data packet session of a first application between a user equipment and a content provider. The method includes receiving, from an application entity configured to block the use of the first application on the user equipment, a first blocking request for blocking use of the first application at the user equipment, the first blocking request including an identifier of the user equipment, and an identifier of the first application. The method further includes transmitting, to other entities of the cellular network, a message informing the other entities of the blocking of the first application, the message includes the identifier of the user equipment, and the identifier of the first application.

20 Claims, 13 Drawing Sheets

(56) References Cited

U.S. PATENT DOCUMENTS

2020/0045770 A1    2/2020  Hu et al.
2021/0092586 A1*   3/2021  Ahmadi ................ H04W 12/08
2021/0250771 A1*   8/2021  Hu ........................ G06F 21/552

FOREIGN PATENT DOCUMENTS

WO    2020020473 A1    1/2020
WO    2020083515 A1    4/2020

OTHER PUBLICATIONS

International Search Report and Written Opinion dated Mar. 15, 2021 for International Application No. PCT/EP2020/071137 filed Jul. 27, 2020; consisting of 12 pages.
SA WG2 Meeting #122bis S2-175393; Title: TS 23.501: Policy Framework; Source: Ericsson; Document for: Approval; Agenda Item: 6.5.6; Work Item/Release: 5GS_Ph1/Rel-15; Date and Location: Aug. 21-25, 2017; Sophia Antipolis, France; consisting of 40 pages.
3GPP TS 23.682 V16.5.0; 3rd Generation Partnership Project; Technical Specification Group Services and System Aspects; Architecture enhancements to facilitate communications with packet data networks and applications (Release 16); Dec. 2019; consisting of 134 pages.
3GPP TS 23.502 V16.5.0; 3rd Generation Partnership Project; Technical Specification Group Services and System Aspects; Procedures for the 5G System (5GS); Stage 2 (Release 16); Jul. 2020; consisting of 594 pages.
Indian Examination Report dated Apr. 26, 2024 for Application No. 202317003125, consisting of 6 pages.

* cited by examiner

NETWORK BLOCKING OF USER EQUIPMENT APPLICATION

CROSS-REFERENCE TO RELATED APPLICATIONS

This application is a Submission Under 35 U.S.C. § 371 for U.S. National Stage Patent Application of International Application No.: PCT/EP2020/071137, filed Jul. 27, 2020 entitled "NETWORK BLOCKING OF USER EQUIPMENT APPLICATION," which claims priority to European Application No.: EP20382562.5, filed Jun. 25, 2020, the entireties of both of which are incorporated herein by reference.

TECHNICAL FIELD

The present invention relates to methods, entities, a system and a computer program for blocking use of an application on a user equipment. In particular the network or entities thereof can be configured, or execute a program, so as to instruct the user equipment to bloc usage of the application. Alternatively, or in addition, the network or entities thereof can be configured, or execute a program, so as to block data between the application and another entity, such as a content provider.

BACKGROUND

Figure 1:
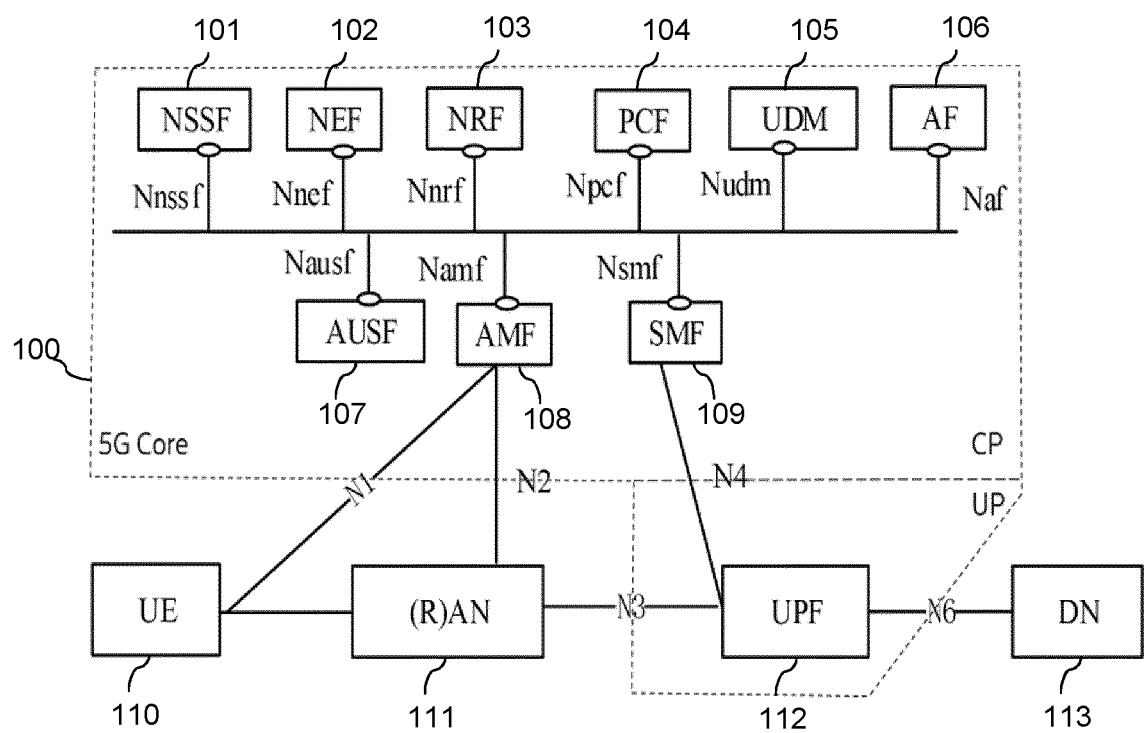

FIG. 1 generally shows a 5G New Radio, NR, architecture. The 5G core network 100 part comprises a Network Slice Selection Function, NSSF, 101, a Network Exposure Function, NEF, 102, a Network Repository Function, NRF, 103, a Policy Control Function, PCF, 104, a Unified Data Management, UDM, 106, an Application Function, AF, 106, an Authentication Server Function, AUSF, 107, an Access and Mobility Management Function, AMF, 108, and a Session Management Function, SMF, 109. Having service based interfaces in the 5G Core Control Plane, CP, implies that the Network Functions, NFs, in the 5G Core CP provide services that are consumed by other NFs in the 5G Core CP.

A User Equipment, UE, 110, is connected to the Radio Access Network, RAN, 111, wherein a User Plane Function, UPF, 112 is provided to connect the UE 110 to a Data Network, DN, 113. The Data Network might comprise, for instance, a content provider capable of exchanging data with the User Equipment 110 through the network.

The roles of these entities and the interfaces between them are defined, for instance, in the 3GPP TS 23.501 and the procedures are described, for instance, in 3GPP TS 23.502.

Relevant 5G System Architecture network aspects and functions for this invention are the following:

Network Exposure Function, NEF, 102 generally is the entry point for Application Service Providers, ASPs, to the Mobile Network Operator Network a.k.a. Connectivity Service Provider, CSP. NEF 102 generally exposes the Connectivity Service Provider Mobile Network capabilities to the ASPs and translates between information as known by the external Application Functions, AFs, and information as known by the Mobile Network Function/s;

Policy Control Function, PCF, 104, generally supports unified policy framework to govern the network behaviour. In particular, PCF 104 generally provides Policy and Charging Control, PCC, rules to the Policy and Charging Enforcement Function, PCEF, that is, SMF 109/UPF 112 that enforces policy and charging decisions according to provisioned PCC rules;

Unified Data Management/Repository, UDM, 105, and UDR, not illustrated. The UDM generally manages network user data in a single, centralized element and can be paired with the UDR, which generally stores user data such as customer profile information, customer authentication information, encryption keys, etc.;

Application Function, AF, 106, generally interacts with the 3GPP Core Network so as to provide information that will allow network operator to manage application's traffic in a certain way;

Session Management Function, SMF, 109 is generally responsible for Session establishment, modification and release, including selection and control of the UPF 112 entities. In the known art, SMF 109 interacts with the UPF 112 over N4 Reference point using Packet Flow Central Protocol, PFCP, procedures. Moreover, SMF 109 generally receives PCC rules from PCF 104 and configures the UPF 112 accordingly;

User Plane Function, UPF, 112, generally supports handling of user plane traffic based on the rules received from SMF 109, in particular packet inspection and different enforcement actions, such as QoS, Charging, etc.;

Control Plane and User Plane separation, CUPS, in particular between Session Management Function, SMF, 109 and User Plane Function, UPF, 112, which is further explained below;

Network Data Analytics Function, NWDAF, 114, is generally used for data collection and data analytics in centralized manner;

Binding Support Function, BSF, not shown in FIGS. 1*a* and 1*b*, is generally used to find the PCF 104 in charge of the user Packet Data Unit, PDU, connection policy session in scenarios with more than one PCF 104.

In the Packet Core of the 4G System Architecture:

SCEF (Service Capability Exposure Function) generally plays the role of NEF 102 above, at least for the APIs (Application Programming Interfaces) listed above which are supported also in 4G;

PCRF (Policy and Charging Rules Function) generally plays the role of the PCF 104 above;

network's Home Subscriber Service, HSS, generally plays the role of UDM 105 above;

SCS/AF (Service Capability Server/Application Function) generally plays the role of AF 106 above;

PGW-C (Control plane of the Packet Data Network Gateway) and/or TDF-C (Control plane of the Traffic Detection Function) generally plays the role of the SMF 109 above;

PGW PGW-U (User plane of the Packet Data Network Gateway) and/or TDF-U (User plane of the Traffic Detection Function) generally plays the role of the UPF 112 above.

In the following, Mobile Core will refer to any, the 5G Core or the Packet Core of the 4G System Architecture. Moreover, throughout the application, the Mobile Network might be referred to as cellular network.

While the general purpose of the cellular network is to allow the user equipment 110 to exchange data with a plurality of content providers through the network, there might be cases in which this exchange needs to be limited. That is, for instance referring to an application running on the user equipment 110 and exchanging data with a content provider, there might be cases in which it is wished to limit use of the application. Example of those cases can be, for instance, related to parental control, to the right to disconnect, to concentration demanding activities, etc.

Parental controls generally refers to functions allowing parents to control the way their children access to online data. For instance, the type and amount of data can be controlled, the time at which those data is made available to the children, etc. Those features may be included in digital television services, computers, video games, mobile devices and generally software so as to allow parents to control the access of content to their children.

These controls are generally intended to assist parents in their ability to restrict certain content viewable by their children. This may be content they deem inappropriate for their age; maturity level or feel is aimed more at an adult audience. Parental controls generally fall into roughly four categories:

- content filters, which limit access to age inappropriate content;
- usage controls, which constrain the usage of these devices such as placing time-limits on usage or forbidding certain types of usage;
- computer usage management tools, which enforces the use of certain software; and
- monitoring, which can track location and activity when using the devices.

The right to disconnect is a proposed human right regarding the ability of people to disconnect from work and primarily not to engage in work-related electronic communications such as e-mails or messages during non-work hours. The modern working environment has been drastically changed by new communication and information technologies. The boundary between work life and home life has shrunk with the introduction of digital tools into employment. While digital tools bring flexibility and freedom to employees, they also can create an absence of limits, leading to excessive interference in the private lives of employees. For this reason, such a right is beneficial. Several countries, primarily in Europe, have some form of the right to disconnect included in their law, while in some cases it is present in the policy of many large companies.

Concentration demanding activities, such as driving, studying, working, etc. can generally be considered to be activities where it might be beneficial to block the normal user equipment operations in order for the user to not be distracted when carrying out concentration demanding or potentially risky activities.

It is thus clear that there is a number of cases in which it is desirable that the use of applications on the user equipment is inhibited, either by blocking the use of the application per se, or by blocking data exchange with the application. While for some applications, i.e. video streaming, both approaches result in the impossibility for the user to use the application, or parts of it, for some other applications, i.e. video games, might, the former approach might be more beneficial.

In the context of the application, unless otherwise specified, blocking use of an application is intended to cover all those cases, that is, blocking the running of the software corresponding to the application, or parts of it, so that the application cannot be run on the user equipment, or cannot execute all of its functionalities, as well as blocking data exchange between the application and a third party, such as for instance a content provider, so that even if the application can be run on the user equipment, the inability to exchange data makes it impossible or not meaningful for the user to use the application.

As discussed above, there is thus a number of cases in which blocking the use of certain applications might be beneficial for the user. Often it is also preferable if such blocking can be implemented by a third party, for instance the parents of the user.

Currently, 3GPP networks do not offer the possibility for third parties to block applications on someone else's user equipment. The applications that require this functionality must rely on user equipment centric solutions. that is, application blocking capabilities of the user equipment operating system, such as Android, or installing application blocking software in the user equipment, such as Qustodio.

Those solutions however might often require the third party to have physical access to the device in order to configure and/or activate the block of the application, which might not always be possible. Moreover, since those solutions are user equipment based, if the owner of the user equipment finds a way to circumvent the block, for instance by removing and/or hacking the application blocking software, the third party might not be aware of it and the user might use applications which were intended to be blocked.

SUMMARY

Accordingly, there is a need for techniques which allow third parties to block the use of applications on a user equipment. This need is met by the features of the independent claims. Further aspects are described in the dependent claims.

Generally, aspects of the invention allow a network-driven solution for application blocking in 3GPP networks. This can generally be obtained by exposing an interface to third parties, offering the capability to request the blocking of a certain application, application type and/or application component, possibly for a certain user. In some cases, the application blocking can be requested during a certain time. The blocked applications information can be stored along with the user subscription data. The user equipment can receive the information on the applications to block. Subsequently, the UE can block the execution of the indicated application. In some cases, a user plane function can also receive the information on the applications to block. Subsequently, if traffic of the indicated applications is detected, the user plane function can block the traffic related to the application and possibly trigger a notification message towards the third party that issued the blocking request.

According to one aspect, a method for operating a network exposure entity in a cellular network is provided, the cellular network being operable to transmit at least a data packet session of a first application between a user equipment and a content provider. The method can comprise a step of receiving, from an application entity configured to block the use of the first application on the user equipment, a first blocking request for blocking use of the first application at the user equipment, the first blocking request comprising an identifier of the user equipment, and an identifier of the first application. Furthermore, the method can comprise a step of transmitting to other entities of the cellular network, a message informing the other entities of the blocking of the first application, the message comprising the identifier of the user equipment, and the identifier of the first application.

Another aspect furthermore relates to a network exposure entity for a cellular network comprising a processing unit and a memory, the memory comprising instructions configured to cause the processing unit to carry out the steps described above for the method for operating the network exposure entity.

Another aspect furthermore relates to a network exposure entity for a cellular network, the cellular network being operable to transmit at least a data packet session of a first application between a user equipment and a content provider, the network exposure entity comprising a module for receiving, from an application entity configured to block the use of the first application on the user equipment, a first blocking request for blocking use of the first application at the user equipment, the first blocking request comprising an identifier of the user equipment, and an identifier of the first application. The network exposure entity further comprising a module for transmitting, to other entities of the cellular network, a message informing the other entities of the blocking of the first application, the message comprising the identifier of the user equipment, and the identifier of the first application.

According to another aspect, a method for operating a policy control entity in a cellular network is provided, the cellular network being operable to transmit at least a data packet session of a first application between a user equipment and a content provider. The method can comprise a step of receiving, from a network exposure entity of the cellular network, a second blocking request for blocking use of the first application at the user equipment, the second blocking request comprising an identifier of the user equipment, and an identifier of the first application. Moreover, the method can comprise a step of checking whether the user is connected to the cellular network and a step of transmitting, to an access management entity of the cellular network, a third blocking request for blocking use of the first application at the user equipment, based on the outcome of the checking step, the third blocking request comprising the identifier of the user equipment, and the identifier of the first application.

Another aspect furthermore relates to a policy control entity for a cellular network comprising a processing unit and a memory, the memory comprising instructions configured to cause the processing unit to carry out the steps described above for the method for operating the policy control entity.

Another aspect furthermore relates to a policy control entity for a cellular network, the cellular network being operable to transmit at least a data packet session of a first application between a user equipment and a content provider, the policy control entity comprising a module for receiving, from a network exposure entity of the cellular network, a second blocking request for blocking use of the first application at the user equipment, the second blocking request comprising an identifier of the user equipment and an identifier of the first application. The policy control entity further comprising a module for checking whether the user equipment is connected to the cellular network, and a module for transmitting, to an access management entity of the cellular network, a third blocking request for blocking use of the first application at the user equipment, based on the outcome of the checking step, the third blocking request comprising the identifier of the user equipment, and the identifier of the first application.

According to another aspect, a method for operating a user plane entity in a cellular network is provided, the cellular network being operable to transmit at least a data packet session of a first application between a user equipment and a content provider. The method can comprise a step of detecting data between the first application and the content provider, a step of blocking the data between the first application and the content provider, and a step of transmitting, to a session control entity of the cellular network, a first data report for notifying blocking of data exchanged with the first application.

Another aspect furthermore relates to a user plane entity for a cellular network comprising a processing unit and a memory, the memory comprising instructions configured to cause the processing unit to carry out the steps described above for the method for operating the user plane entity.

Another aspect furthermore relates to a user plane entity for a cellular network, the cellular network being operable to transmit at least a data packet session of a first application between a user equipment and a content provider, the user plane entity comprising a module for detecting data between the first application and the content provider, a module for blocking the data between the first application and the content provider, and a module for transmitting, to a session control entity of the cellular network, a first data report for notifying blocking of data exchanged with the first application.

According to another aspect, a method for operating a user equipment connectable to a cellular network is provided, the cellular network being operable to transmit at least a data packet session of a first application between a user equipment and a content provider. The method can comprise a step of receiving, from the cellular network, a fourth blocking request for blocking use of the first application, the fourth blocking request comprising an identifier of the first application. Moreover, the method can comprise a step of blocking the first application identified by the identifier, based on the fourth blocking request.

Another aspect furthermore relates to a user equipment connectable to a cellular network comprising a processing unit and a memory, the memory comprising instructions configured to cause the processing unit to carry out the steps described above for the method for operating the user equipment.

Another aspect furthermore relates to a user equipment connectable to a cellular network, the cellular network being operable to transmit at least a data packet session of a first application between a user equipment and a content provider, the user equipment comprising a module for receiving, from the cellular network, a fourth blocking request for blocking use of the first application, the fourth blocking request comprising an identifier of the first application, and a module for blocking the first application identified by the identifier, based on the fourth blocking request.

According to another aspect, a method for operating a user equipment connectable to a cellular network is provided, the cellular network being operable to transmit at least a data packet session of a first application between a user equipment and a content provider. The method can comprise a step of transmitting, to the cellular network, a first session establishment request for establishing a session for the user equipment on the cellular network, a step of receiving, from the cellular network, a third session establishment response, the third session establishment response comprising an identifier of the first application, and a step of blocking the first application identified by the identifier.

Another aspect furthermore relates to a user equipment connectable to a cellular network comprising a processing unit and a memory, the memory comprising instructions configured to cause the processing unit to carry out the steps described above for the method for operating the user equipment.

Another aspect furthermore relates to a user equipment connectable to a cellular network, the cellular network being operable to transmit at least a data packet session of a first application between a user equipment and a content provider, the user equipment comprising a module for transmitting, to the cellular network, a first session establishment request for establishing a session for the user equipment on the cellular network, a module for receiving, from the cellular network, a third session establishment response, the third session establishment response comprising an identifier of the first application, and a module for blocking the first application identified by the identifier.

According to another aspect, a method for operating a session control entity in a cellular network is provided, the cellular network being operable to transmit at least a data packet session of a first application between a user equipment and a content provider. The method can comprise a step of receiving, from an access management entity of the cellular network, a second session establishment request for establishing a session for the user equipment on the cellular network. The method can further comprise a step of transmitting, to a policy control entity of the cellular network, a first policies request for obtaining policies applicable to the session, and a step of receiving, from the policy control entity, a second policies message, in response to the first policies request, the second policies message comprising an identifier of the first application. The method can also further comprise a step of transmitting, to the access management entity, a second session establishment response, in response to the second session establishment request, the second session establishment response comprising the identifier of the first application.

Another aspect furthermore relates to a session control entity for a cellular network comprising a processing unit and a memory, the memory comprising instructions configured to cause the processing unit to carry out the steps described above for the method for operating the session control entity.

Another aspect furthermore relates to a session control entity for a cellular network, the cellular network being operable to transmit at least a data packet session of a first application between a user equipment and a content provider, the session control entity comprising a module for receiving, from an access management entity of the cellular network, a second session establishment request for establishing a session for the user equipment on the cellular network. The session control entity further comprising a module for transmitting, to a policy control entity of the cellular network, a first policies request for obtaining policies applicable to the session, and a module for receiving, from the policy control entity, a second policies message, in response to the first policies request, the second policies message comprising an identifier of the first application. The session control entity further comprising module for transmitting, to the access management entity, a second session establishment response, in response to the second session establishment request, the second session establishment response comprising the identifier of the first application.

According to another aspect, a method for method for operating a user plane entity in a cellular network is provided, the cellular network being operable to transmit at least a data packet session of a first application between a user equipment and a content provider. The method can comprise a step of detecting data between the first application and the content provider, a step of blocking data between the first application and the content provider, and a step of transmitting, to a session control entity of the cellular network, a first data report for notifying blocking of data between the first application and the content provider, based on the step of detecting and/or on the step of blocking.

Another aspect furthermore relates to a user plane entity for a cellular network comprising a processing unit and a memory, the memory comprising instructions configured to cause the processing unit to carry out the steps described above for the method for operating the user plane entity.

Another aspect furthermore relates to a user plane entity for a cellular network, the cellular network being operable to transmit at least a data packet session of a first application between a user equipment and a content provider, the user plane entity comprising a module for detecting data between the first application and the content provider, a module for blocking data between the first application and the content provider, and a module for transmitting, to a session control entity of the cellular network, a first data report for notifying blocking of data between the first application and the content provider, based on the step of detecting and/or on the step of blocking.

Another aspect furthermore relates to a system comprising at least two entities selected from any of the entities above.

A further aspect relates to a computer program comprising program code to be executed by at least one processing unit of a network exposure entity, a policy control entity, a user plane entity, a user equipment, a session control entity, wherein execution of the program code causes the processing unit to carry out a method as mentioned above for the respective entity.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

Other devices, systems, methods, features and advantages will be or will become apparent to one with skill in the art upon examination of the following detailed description and figures. It is intended that all such additional systems, methods, features and advantages be included within this description, be within the scope of the invention and be protected by the following claims.

DETAILED DESCRIPTION OF DRAWINGS

Figure 2A:
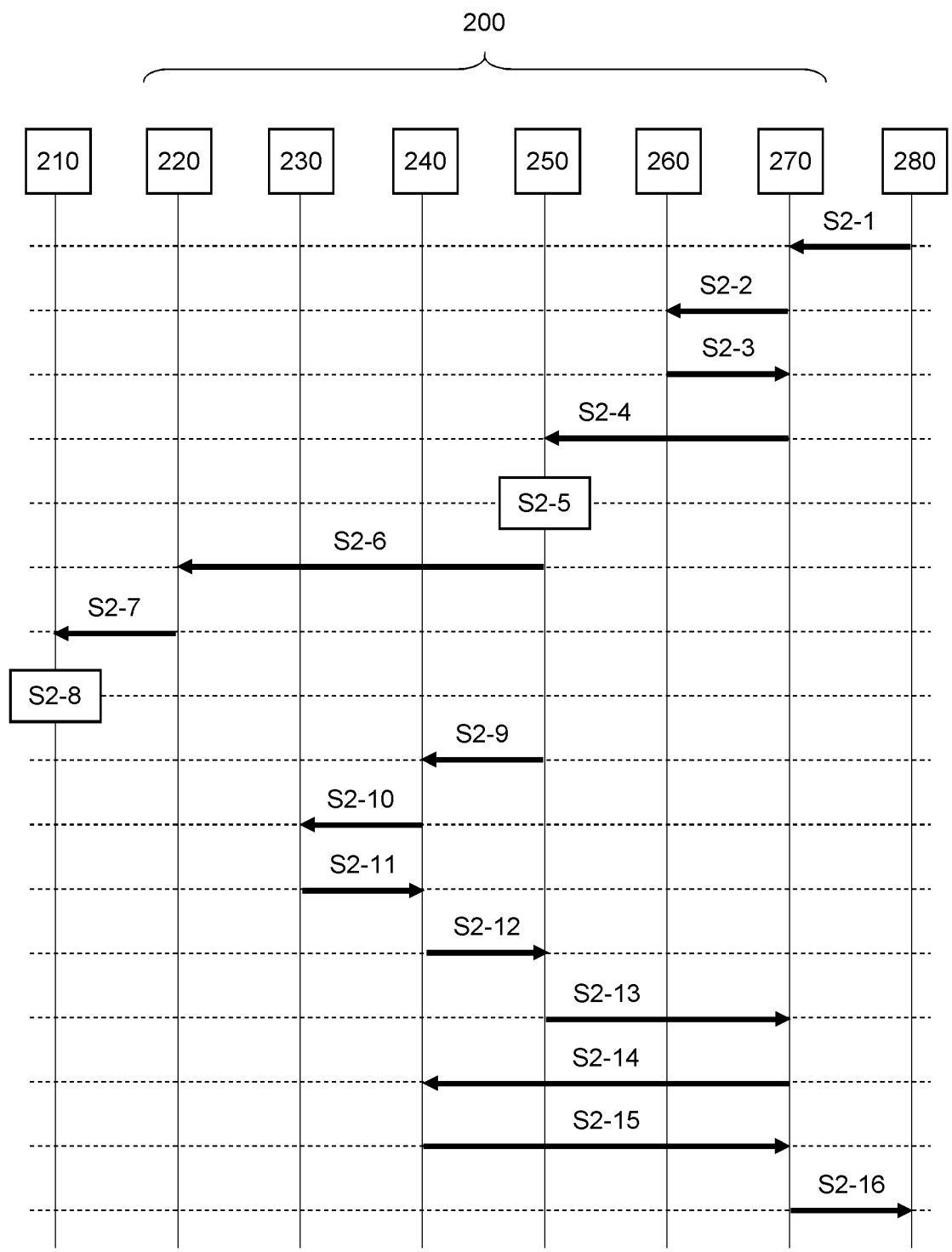
Figure 2B:
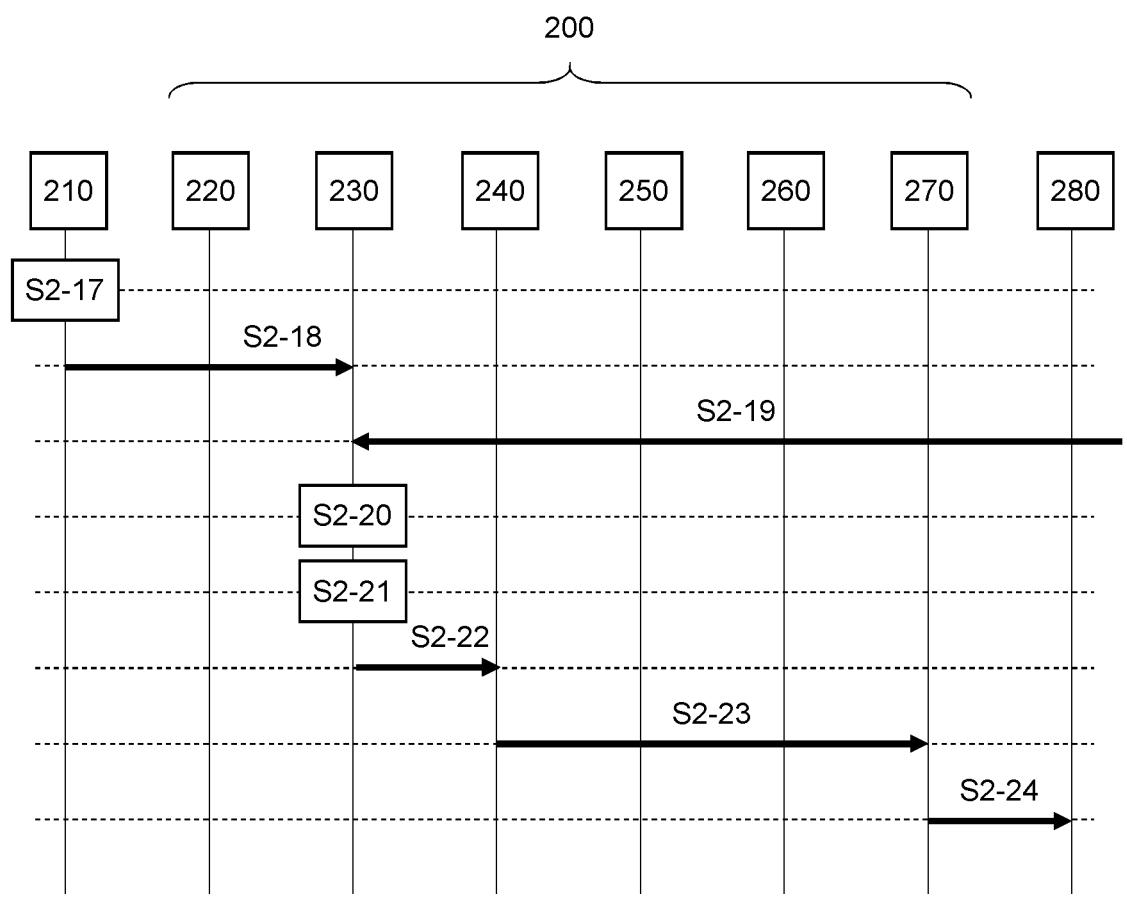
Figure 3A:
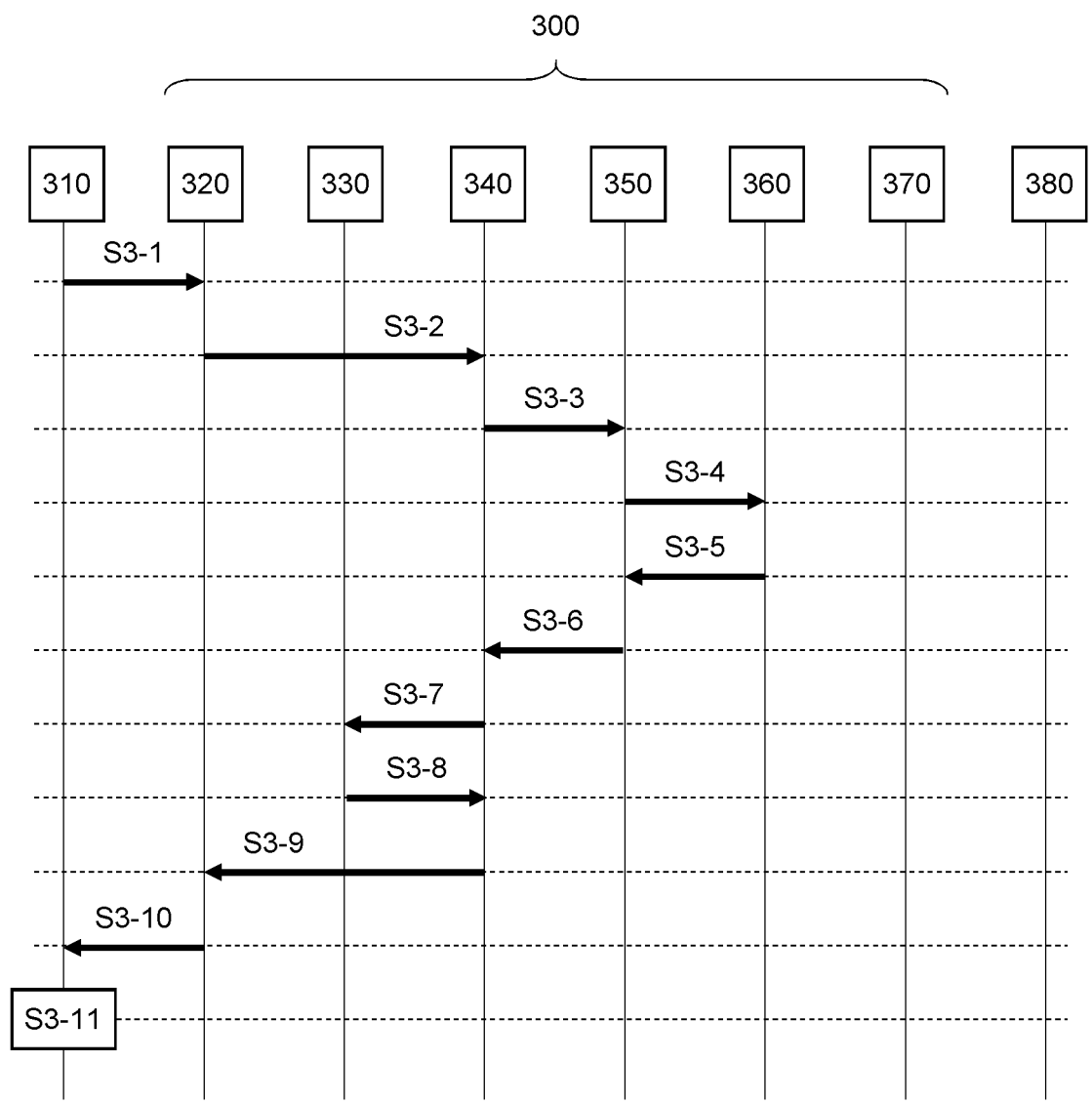
Figure 3B:
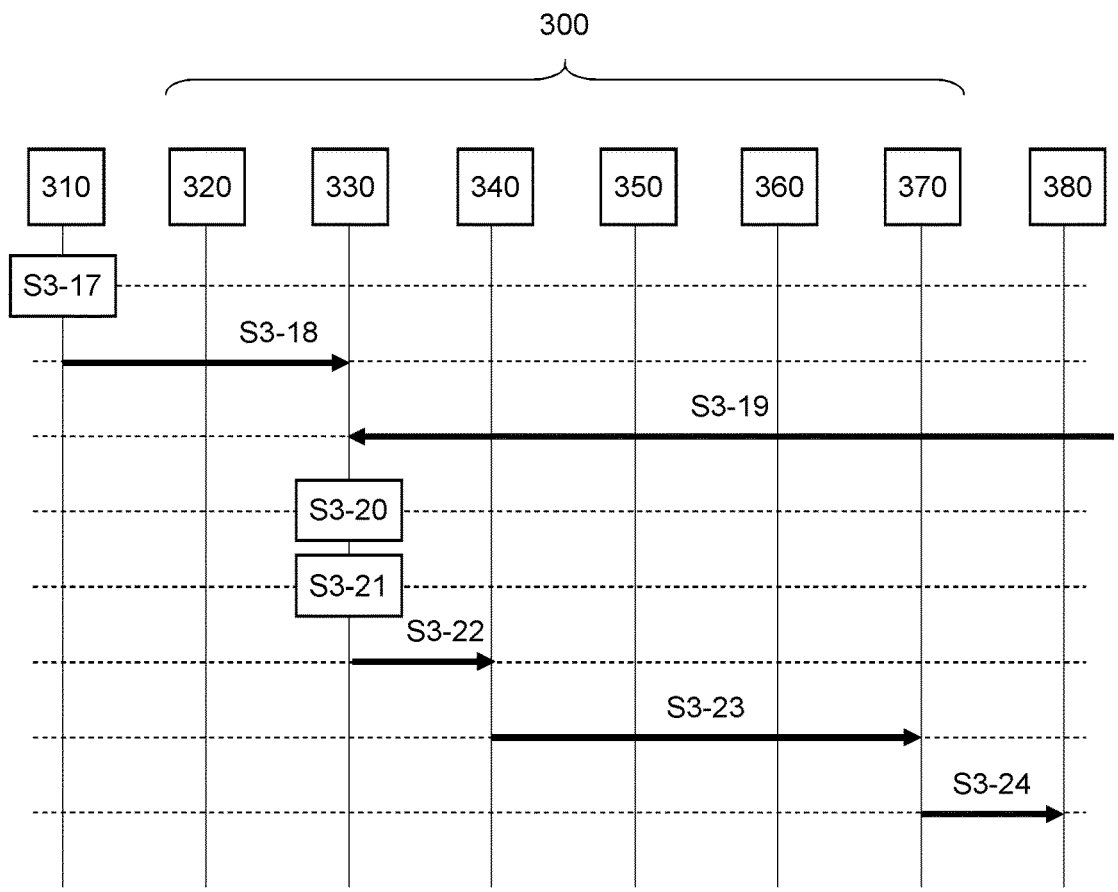
Figure 4:
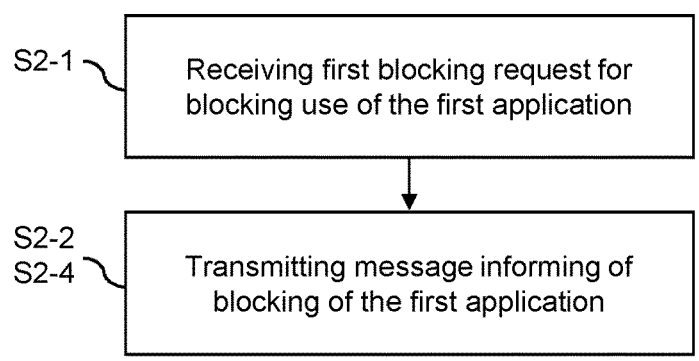
Figure 5:
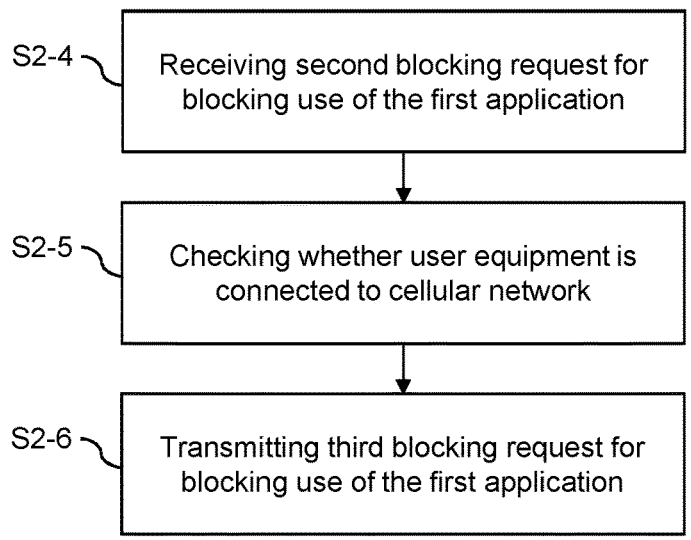
Figure 6:
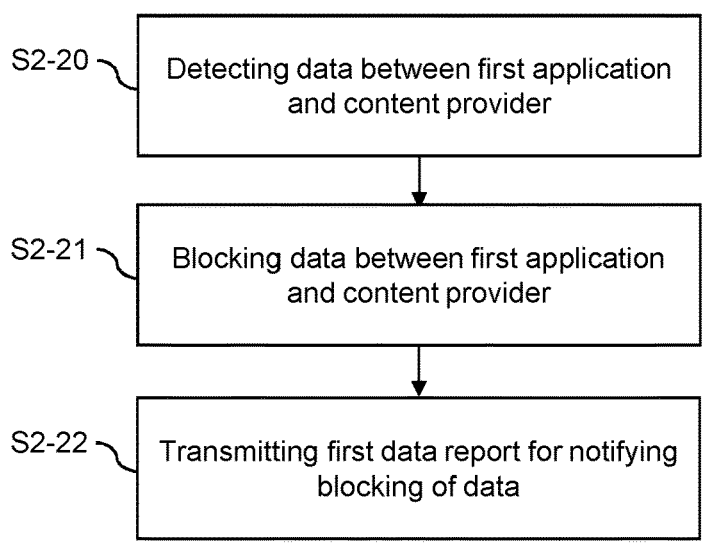
Figure 7:
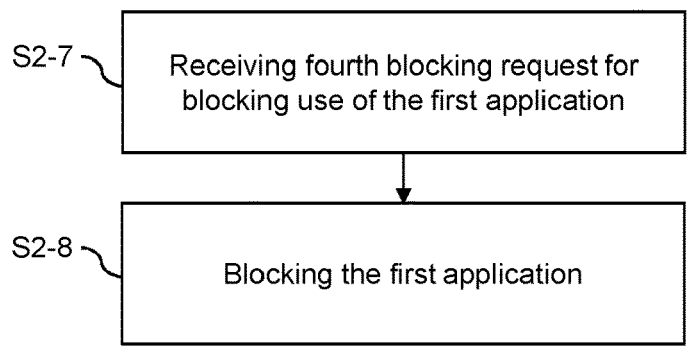
Figure 8:
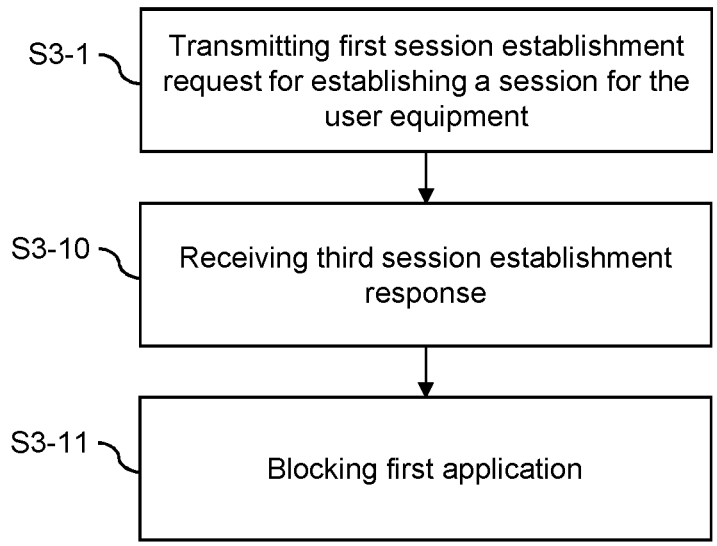
Figure 9:
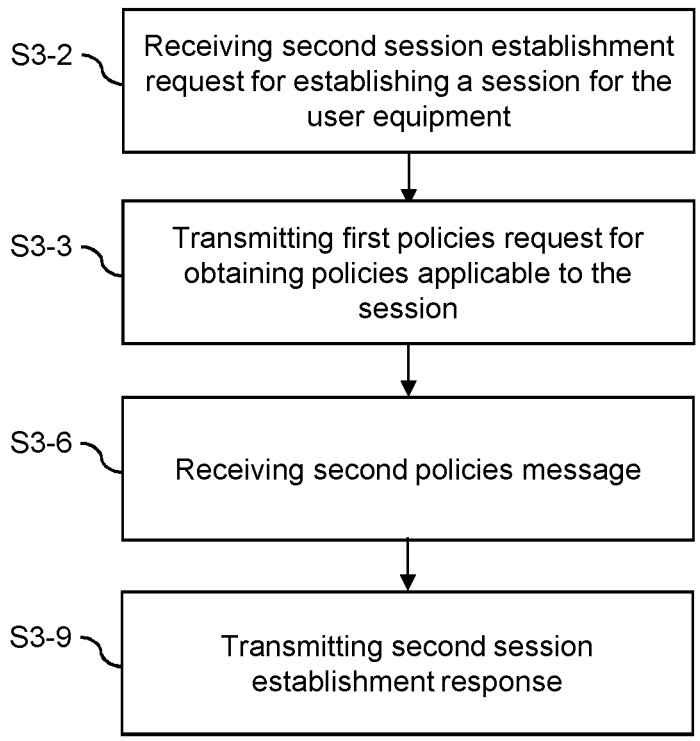
Figure 10:
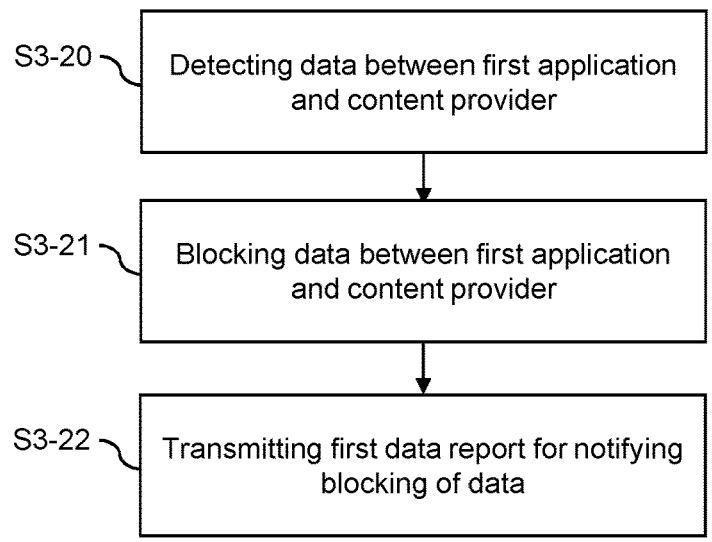
Figure 11A:
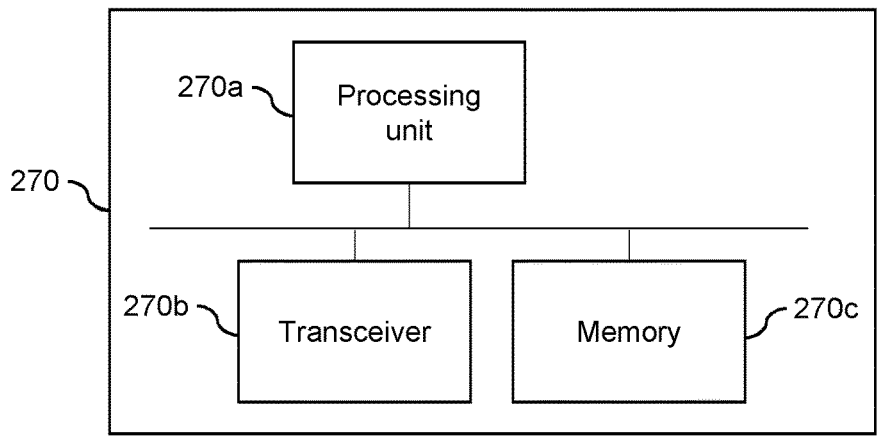
Figure 11B:
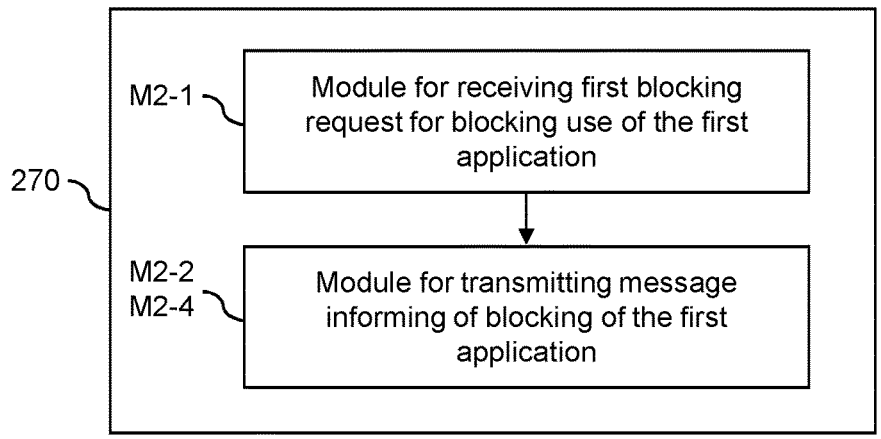
Figure 12A:
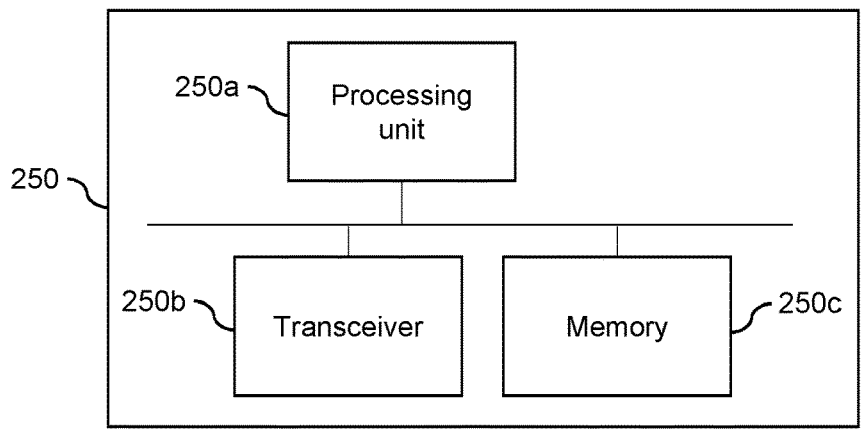
Figure 12B:
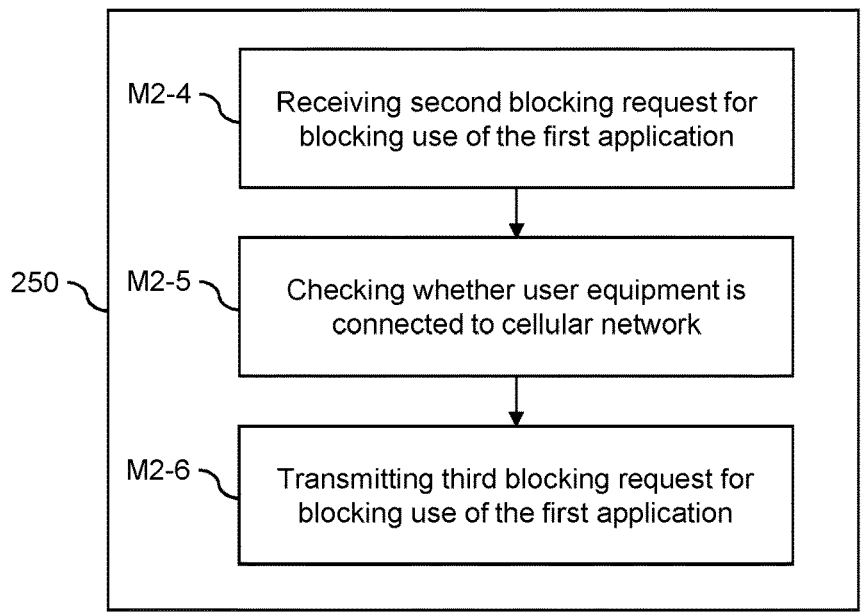
Figure 13A:
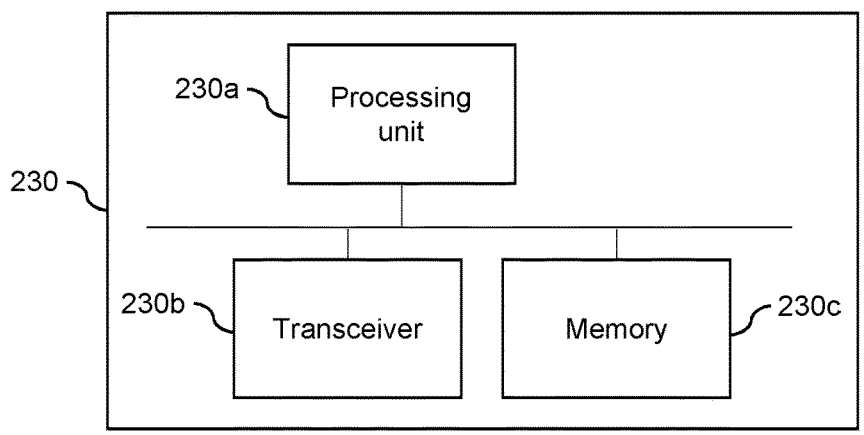
Figure 13B:
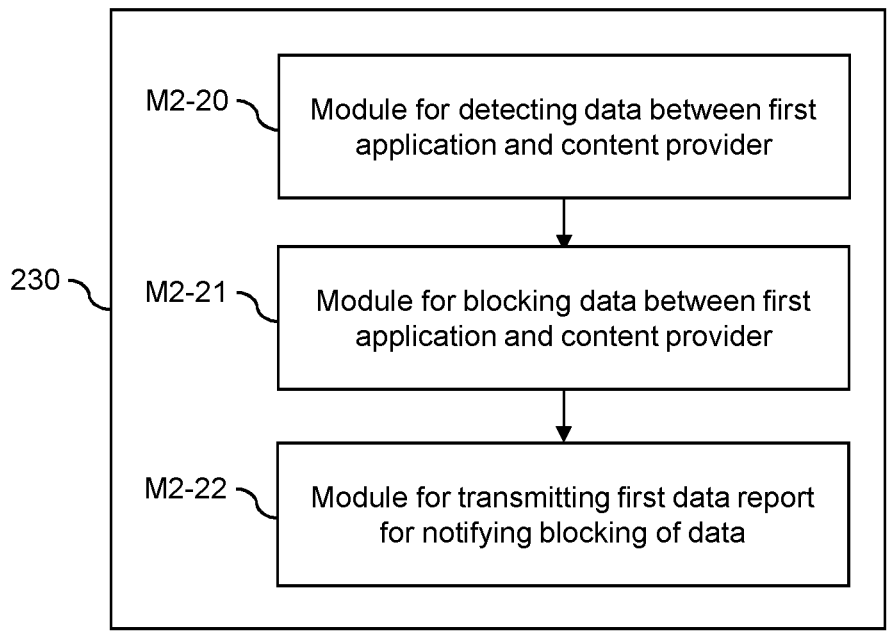
Figure 14A:
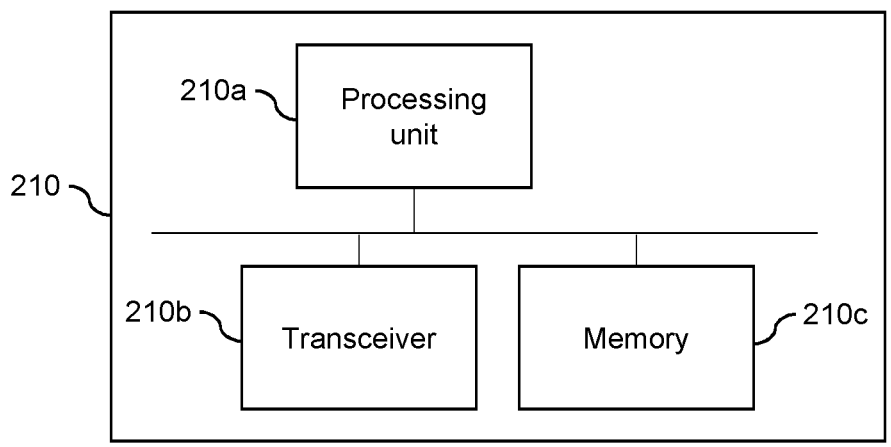
Figure 14B:
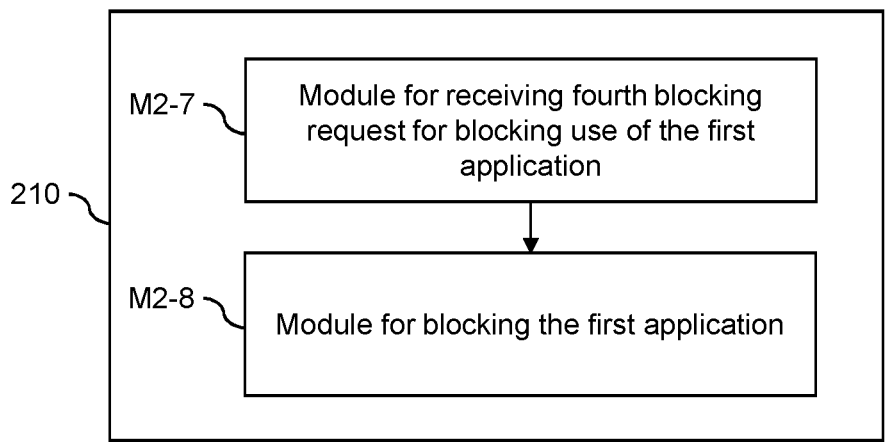
Figure 15A:
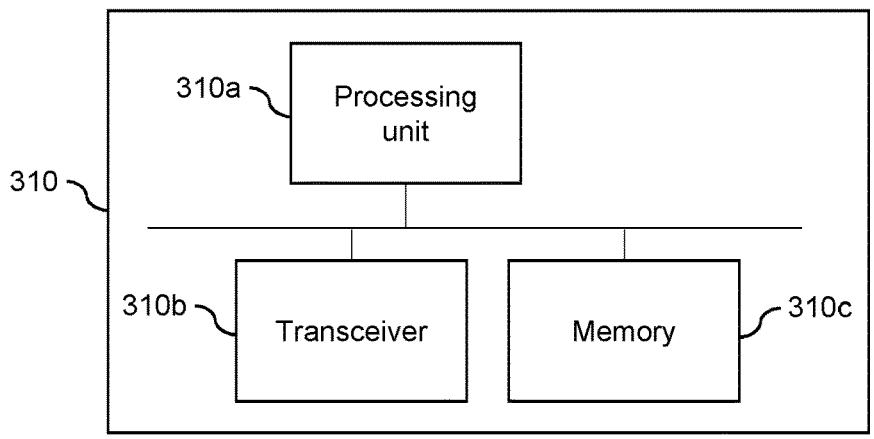
Figure 15B:
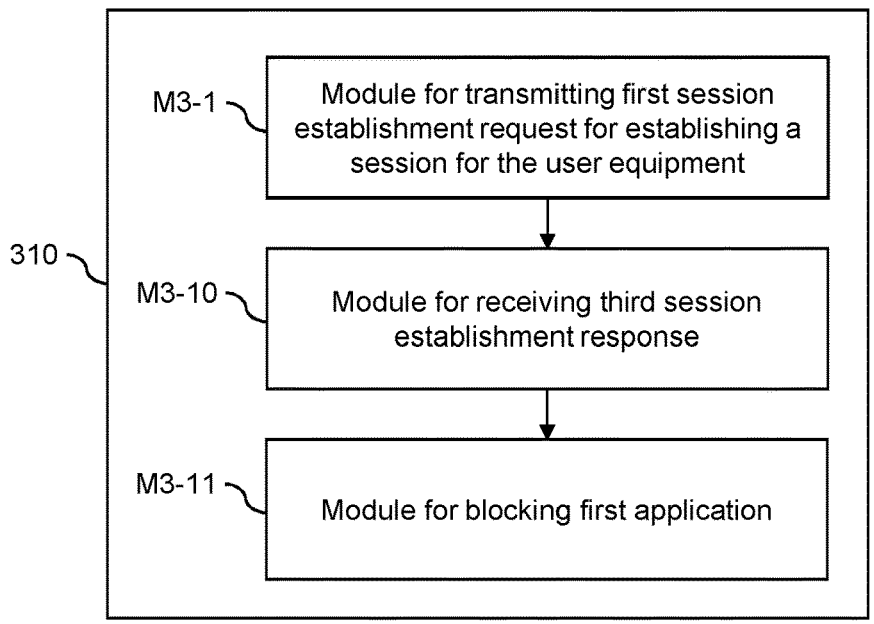
Figure 16A:
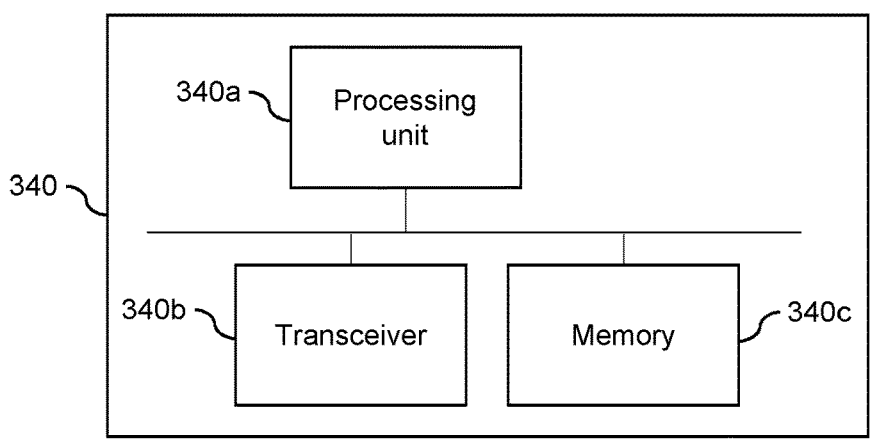
Figure 16B:
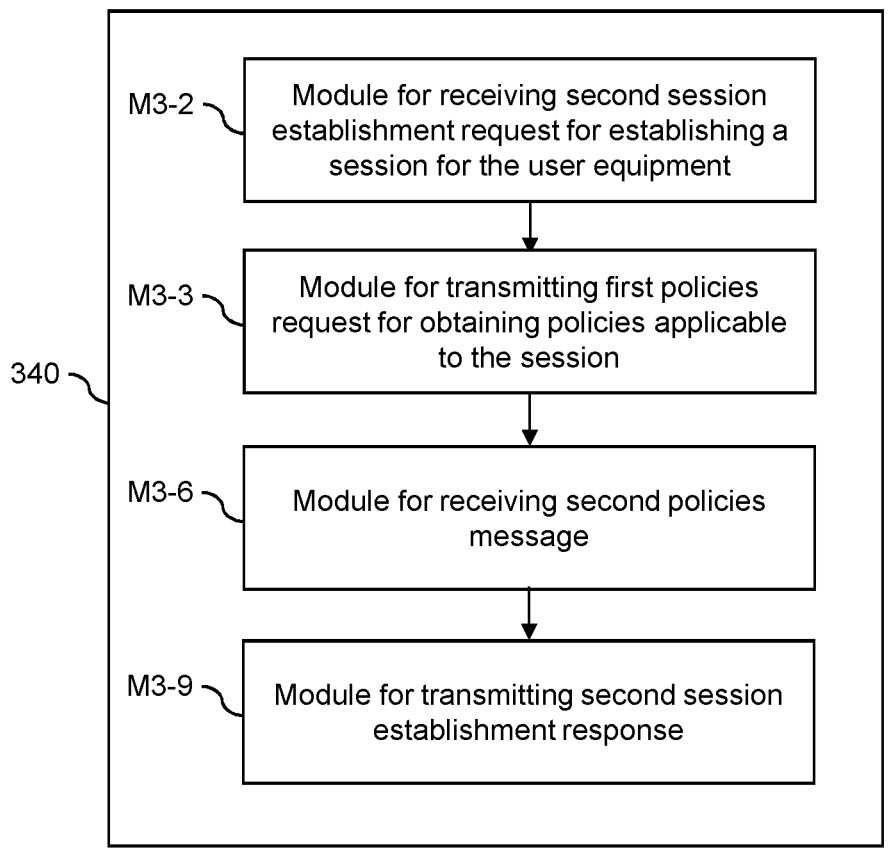
Figure 17A:
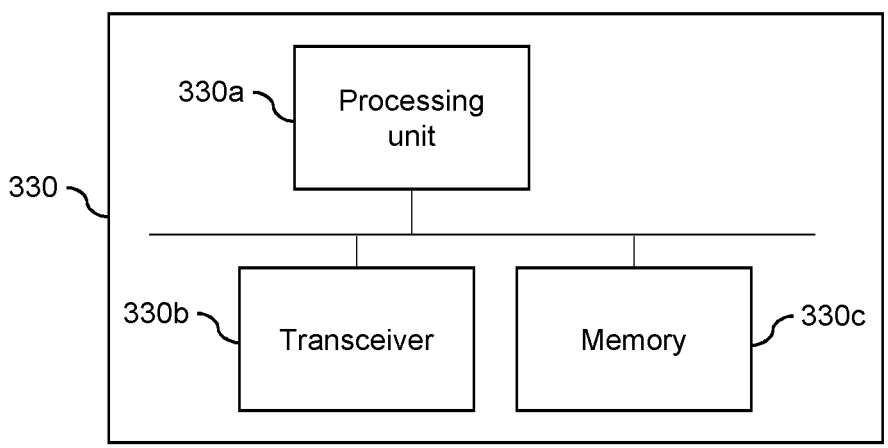
Figure 17B:
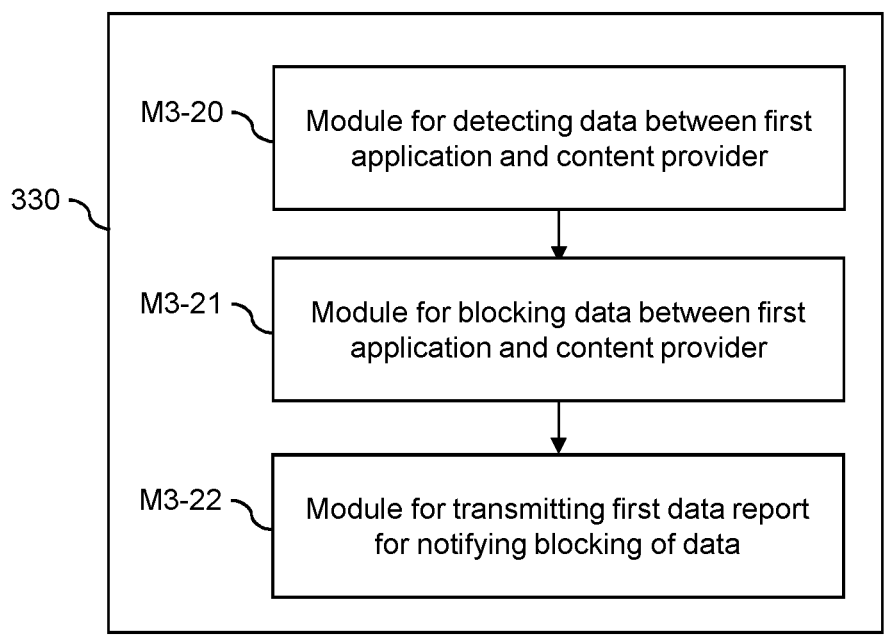

Various features of embodiments will become more apparent when read in conjunction with the accompanying drawings. In these drawings:

FIG. 1 schematically illustrates the 5G NR reference architecture as currently defined by 3GPP;

FIGS. 2a and 2b schematically illustrate an example flowchart of a method for operating entities of a cellular network for blocking use of an application on a user equipment;

FIGS. 3a and 3b schematically illustrate an example flowchart of a further method for operating entities of a cellular network for blocking use of an application on a user equipment;

FIG. 4 schematically illustrate a method for operating a network exposure entity in a cellular network for blocking use of an application on a user equipment, FIG. 5 schematically illustrate a method for operating a policy control entity in a cellular network for blocking use of an application on a user equipment, FIG. 6 schematically illustrate a method for operating a user plane entity in a cellular network for blocking use of an application on a user equipment, FIG. 7 schematically illustrate a method for operating a user equipment connectable to a cellular network for blocking use of an application on the user equipment, FIG. 8 schematically illustrate a method for operating a user equipment connectable to a cellular network for blocking use of an application on the user equipment, FIG. 9 schematically illustrate a method for operating a session control entity in a cellular network for blocking use of an application on a user equipment, FIG. 10 schematically illustrate a method for operating a user plane entity in a cellular network for blocking use of an application on a user equipment, FIGS. 11a and 11b schematically illustrate a network exposure entity in a cellular network operable to block use of an application on a user equipment, FIGS. 12a and 12b schematically illustrate a policy control entity in a cellular network operable to block use of an application on a user equipment, FIGS. 13a and 13b schematically illustrate a user plane entity in a cellular network for blocking use of an application on a user equipment, FIGS. 14a and 14b schematically illustrate a user equipment connectable to a cellular network operable to block use of an application on the user equipment, FIGS. 15a and 15b schematically illustrate a user equipment connectable to a cellular network operable to block use of an application on the user equipment, FIGS. 16a and 16b schematically illustrate a session control entity in a cellular network operable to block use of an application on a user equipment, FIGS. 17a and 17b schematically illustrate a user plane entity in a cellular network operable to block use of an application on a user equipment.

DETAILED DESCRIPTION OF PREFERRED EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The user equipment may also be associated with non-humans like animals, plants, or machines. A user equipment may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the user equipment. The presence of a SIM within a user equipment customizes the user equipment uniquely with a subscription of the user. The cellular network is generally any communication network which allows a wireless communications with the user equipment. In some embodiments, the cellular network can be an LTE network or a 5G NR network.

FIGS. 2a and 2b shows example flowcharts of methods for operating various entities of a cellular network 200. In particular the method allows the blocking of a first application in a user equipment 210.

It will be understood that while FIGS. 2a and 2b illustrate a plurality of entities and steps, not all of those entities and steps are necessary for implementing the invention. FIGS. 2a and 2b will be described first in their entirety, so as to allow a better understanding of how the various embodiments might cooperate together. Specific embodiments of the invention will then be described, with reference to some of the entities and steps of FIGS. 2a and 2b.

In FIGS. 2a, 2b, 3a, 3b:

reference numeral 200, 300 indicates a cellular network, reference numeral 210, 310 indicates a user equipment, reference numeral 220, 320 indicates a access management entity, for instance the Access and Mobility Management Function, AMF, 108 previously described, where applicable modified to carry out the method described below, reference numeral 230, 330 indicates a user plane entity, for instance the User Plane Function, UPF, 112 previously described, where applicable modified to carry out the method described below, reference numeral 240, 340 indicates a session control entity, for instance the Session Management Function, SMF, 109 previously described, where applicable modified to carry out the method described below, reference numeral 250, 350 indicates a policy control entity, for instance the Policy Control Function, PCF, 104 previously described, where applicable modified to carry out the method described below, reference numeral 260, 360 indicates a subscriber database, for instance a Unified Data Repository, UDR, in the context of a 5G implementation, reference numeral 270, 370 indicates a network exposure entity, for instance the Network Exposure Function, NEF, 102 previously described, where applicable modified to carry out the method described below, reference numeral 280, 380 indicates an application entity, for instance the Application Function, AF, 106 previously described, where applicable modified to carry out the method described below.

In the following some steps will be referred to as first, second, third, etc. It is understood this is intended merely to provide a different naming for the various steps and does not imply a specific temporal or importance order of the steps.

At step S2-1, a first blocking request is transmitted from the application entity 280 to the network exposure entity 270. The general purpose of this step is to allow the application entity 280 to request to the network to block use of the first application on the user equipment 210.

In some cases, the request might be implemented by a second application, running on the application entity 280, or in contact with the application entity 280. For instance, the second application might be an application installed on a user equipment of a parent, capable of communicating with the application entity 280, so as to block use of the first application running on a user equipment 210 of a child.

In some embodiments, the first blocking request might comprise one or more elements among:
- an identifier, UE-ID, of the user equipment 210, allowing the network 200 to identify the user equipment 210,
- an identifier, App-ID or App-type, of the first application, allowing the network 200 and/or the user equipment 210 to identify the first application. For instance, the App-ID might indicate a specific application such as "YouTube", similarly, the App-type might indicate a class of applications, such as "video". The same application may have different App-IDs depending on the UE's operating system, in those cases the proper App-ID is used so that the UE can identify the application,
- an identifier of a component of the application, App-component, allowing the network 200 and/or the user equipment 210 to identify the component or feature of the first application. For instance the App-component field might indicate "app-notifications", or "voice-calls", "sound-alarms", etc.
- a time indication for the blocking of the first application, Time, for instance an initial time from which the first application is to be blocked, an end time until which the first application is to be blocked, a time interval, days of the week, calendar days, etc.

After step S2-1 the network exposure entity 270 can check that the application entity 280 is properly authenticated and has the proper permissions to request the application blocking for the given user equipment, for instance following known authentication mechanisms and leveraging subscription information. For instance the requesting application function 280 can be associated with a certain "family plan" in the parental control use case, or if the application function 280 is associated with the user equipment's company in the right to disconnect use case, etc.

Following the step S2-1 the network 200 is generally informed of the request to block use of the first application. Several manners can be implemented for the network exposure entity 270 to forward this request to other entities of the network 200. In the following, a specific implementation will be discussed in which the network exposure entity 270 transmits this request to the subscriber database 260 and/or to the policy control entity 240. It is however understood that other implementations are possible and that the blocking request does not necessarily need to be transmitted to both the subscriber database 260 and to the policy control entity 250.

At step S2-2 an updating request is transmitted from the network exposure entity 270 to the subscriber database 260. The general purpose of this step is to record in the subscriber database 260 one or more details related to the blocking request, for instance one or more of the elements previously described as content of the first blocking request of step S2-1. In some embodiments, the updating of the UE subscription data can be implemented by using a new data set, such as "blocked apps". The new data set indication can also be included in the message from the network exposure entity 270 to the subscriber database 260.

At step S2-3 an acknowledging message is transmitted from the subscriber database 260 to the network exposure entity 270 to acknowledge the requested update of the UE subscription data.

At step S2-4, a second blocking request is transmitted from the network exposure entity 270 to the policy control entity 250. The general purpose of this step is to allow the policy control entity 250 to further forward the blocking request to the user equipment 210, and/or to allow the policy control entity 250 to configure the network 200 so as to block data to and/or from the first application on the user equipment 210. Those two manners for blocking use of the first application, by blocking execution of it, or parts of it, on the user equipment 210, or by blocking data related to it through the network 200, might be implemented independently, or, advantageously, together. In the following description the blocking of the execution of the application, or parts of it, on the user equipment 210 will be described as being implemented prior to the configuration of the network 200 so as to block the data related to the first application. The invention is however not limited to this configuration and the two approaches might be executed in the inverse order, or in parallel.

In some embodiments, the second blocking request might comprise one or more of the elements already described for the first blocking request.

It will be clear that, although the step S2-4 is illustrated as being carried after the steps S2-2 and S2-3, the invention is not limited thereto and step S2-4, as well as the steps which logically depends on it, might be carried out before, or in parallel to, step S2-2.

At step S2-5, the policy control entity 250 checks if the user equipment 210 is connected to the network 200, that is, for instance, if the user equipment 210 has an already ongoing PDU session. In some embodiments, if the answer to the check is negative, the method can skip the further forwarding of the blocking request to the user equipment 210, while proceeding with the configuration of the network 200 so as to block data related to the first application.

At step S2-6, a third blocking request is transmitted from the policy control entity 250 to the access management entity 220. The general purpose of this step is to allow the access management entity 220 to further forward the blocking request to the user equipment 210. In some embodiments, the third blocking request might comprise one or more of the elements already described for the first blocking request.

At step S2-7, a fourth blocking request is transmitted from the access management entity 220 to the user equipment 210. The general purpose of this step is to allow the user equipment 210 to be informed of the blocking request. In some embodiments, the fourth blocking request might comprise one or more of the elements already described for the first blocking request.

Thus, thanks to the transmission chain implemented by steps S2-1, S2-4, S2-6 and S2-7 it is possible for the user equipment 210 to be informed of the blocking requested issued by the application entity 280. Consequently, at step S2-8 the user equipment 210 can proceed to block the first application. It will be clear that, in some cases, a plurality of first applications might be blocked with a single request, for instance when a type of applications is the subject of the blocking request, as previously described with reference to the identified "App-type" of the first application.

As previously described, the blocking of the application at step S2-8 might render it impossible for the user to execute the first application, or parts of it, on the user equipment. In some cases In some implementations of the invention, the method could thus stop at step S2-8. However, it is possible that the user might hack the blocking operated by step S2-8, so that the invention provides, in addition or as a replacement to the blocking operated at step S2-8, the possibility to block data to and/or from the first application through the network 200, as will be discussed in the following.

At step S2-9, a fifth blocking request is transmitted from the policy control entity 250 to the session control entity. The general purpose of this step is to allow the session control entity 240 carry out a session modification request so as to configure the network 200 in order to block data related to the first application. In some embodiments, the fifth blocking request might comprise one or more of the elements already described for the first blocking request.

At step S2-10, a session modification request is transmitted from the session control entity 240 to the user plane entity 230. The general purpose of this step is to configure the user plane entity so as to detect and/or block data related to the first application.

In some embodiments, the session modification request might be implemented through a PFCP message and/or comprise one or more of the following elements:
- the identifier, UE-ID, of the user equipment 210, for instance the PFCP session ID if the user equipment 210 is identified using this identifier,
- a packet detection rule, PDR, generally allowing data packets related to the first application to be identified. For instance the packet detection rule can comprise any of the elements already discussed for the first blocking request, such as the App-ID, App-type or App-component. Alternatively, or in addition, the packet detection rule can also comprise corresponding traffic filters, such as packet detection information, PDI, in a PFCP implementation,
- quality enforcement rule, QER, preferably including an Application block indication and/or the blocking time,
- usage reporting rule, URR, including the indication to report application activity Thanks to this step the network 200 can be configured so as to recognize data packets related to the first application. This allows the network 200 to block such packets and, where requested, reporting the blocking to the application entity 280.

At step S2-11 a session modification confirmation is transmitted from the user plane entity 230 to the session control entity 240 to acknowledge the requested session modification, in response to step S2-10. Similarly, at step S2-12 a first application blocking confirmation is transmitted from the session control entity 240 to the policy control entity 250, in response to step S2-9.

At step S2-13 a second application blocking confirmation is transmitted from the policy control entity 250 to the network exposure entity 270, in response to step S2-4.

In some embodiments, the second application blocking confirmation can comprise an identifier, for instance the IP address, of the session control entity 240. In those embodiments step S2-14 can then be implemented. In particular, at this step a blocking subscription is transmitted from the network exposure entity 270 to the session control entity 240. The general purpose of this step is to allow the network exposure entity 270 to subscribe to notifications indicating that data related to the first application has been blocked by the network 200.

In some embodiments, the blocking subscription can comprise one or more of the elements already described for the first blocking request, so as to allow identification of the user equipment and/or of the first application. Moreover, in some embodiments, the blocking subscription can comprise an event indication, such as "App activity" to indicate to the session control entity what kind of even should be notified.

At step S2-15 a blocking subscription confirmation is transmitted from the session control entity 240 to the network exposure entity 270, in response to step S2-14. At step S2-16 a third application blocking confirmation is transmitted from the network exposure entity 270 to the application entity 280, in response to step S2-1, informing the application entity 280 that the configuration of the user equipment 210 and/or of the network 200 in order to block use of the first application has been completed.

FIG. 2b generally illustrates a case in which both types of blocking where implemented as described above, namely the first application had been blocked on the user equipment 210 and the network 200 had been configured to block data related to the first application. In the exemplary situation illustrated in FIG. 2b it is assumed that, at step S2-17, the block on the user equipment, carried out at step S2-8, has failed, for instance due to a misconfiguration or to hacking.

At steps S2-18 and/or S2-19 uplink and/or downlink data related to the first application is requested through the network 200.

At step S2-20, thanks to the previous configuration of the network 200, the data is recognized, in particular by the user plane entity 230. At step S2-21, the user plane entity 230 can block the data related to the first application, so as to effectively block use of the first application on the user equipment 210. As can be seen, in those cases in which the network 200 is configured so as to block the data, use of the application can be effectively blocked even in the absence, or in the malfunctioning, of the block carried out at step S2-8 on the user equipment 210.

In some embodiments it might be possible to report that data has been blocked. This is particularly advantageous, for instance, in those cases where step S2-8 had been implemented, so as to inform the application function 280 of the malfunctioning of the block carried out on the user equipment 210. In those embodiments, step S2-22 can be provided in which a first data report is transmitted from the user plane entity 230 to the session control entity 240. The first data report can generally inform the session control entity that data has been blocked, identifying user and/or user terminal to which this apply. In some cases, details of the data and/or of the first application can also be provided.

In particular, in some embodiments, the first data report can comprise one or more of the elements already described for the first blocking request. Alternatively, or in addition, it may comprise an indication, such as "App activity report", generally identifying what kind of event has occurred and is being reported. In some embodiments the first data report can be implemented as a PFPC message.

At step S2-23 a second data report is transmitted from the session control entity 240 to the network exposure entity 270. Similarly, at step S2-24 a third data report is transmitted from the network exposure entity 270 to the application entity 280. The second and third data report can comprise any of the elements already described for the first data report.

This allows the application entity 280 to be informed of the blocked data. In some embodiments this might also be forwarded to the device/application which requested the application entity 280 to block the first application, where applicable, for instance to a parental control application on a user terminal of the parents indicating, such as the second application described above, indicating the detection of activity of a blocked application.

One possible, exemplary, embodiment of the messages exchanged in the method according to FIGS. 2*a* and 2*b*, written in pseudo-code, can for instance be formalized as:

S2-1: application blocking request including: UE-ID, App-ID and/or App-type, App-component, Time S2-2: transmitting the above information to subscriber database 260, storing the above information within the user equipment 210 subscription data, for instance using a new data set "blocked apps". The data set indication can also be included in the message from network exposure entity 270 to subscriber database 260, S2-3: acknowledging subscription request S2-4: application blocking request including: UE-ID, App-ID and/or App-type, App-component, Time, S2-5: checking that user equipment 210 has an already ongoing PDU session, S2-6: application blocking request including application blocking information for the UE-ID, S2-7: receiving application blocking information, UE-ID, App-ID and/or App-type, App-component, Time, S2-8: blocking execution of the indicated applications during the indicated time, S2-9: application blocking request including the application blocking information for the UE-ID, S2-10: application blocking information: UE-ID, or PFCP session ID if the user equipment 210 is identified using this identifier, PDR including the App-ID and/or App-type or App-component and the corresponding traffic filters, PDI, Packet Detection Information in PFCP, to classify the traffic accordingly into the App-ID, or App-type or App-component traffic classes, QER including the application block indication and the blocking time, URR including the indication to report application activity S2-11: acknowledging the session modification, S2-12. acknowledging the application block request, S2-13: acknowledgment for application block request including the session control entity 240 IP address, S2-14: subscribing to application activity reports for the blocked applications/app-types/app-components, including: Event=App activity, Target App-ID/App-type/App component, S2-15: acknowledging the subscription request, S2-16: acknowledging the app block request to application entity 280, S2-17: application blocking fails in the user equipment 210 or the user equipment 210 is hacked, S2-18: blocked application sends UL traffic, S2-19: blocked application server tries to send information to the blocked application in the user equipment 210, S2-20. detecting traffic of blocked application, S2-21: blocking, at user plane entity 230, traffic to/from the blocked application S2-22: PFCP report message indicating the detection of activity of a blocked application, including: UE-ID, App-ID/App-type/App component, Indication of the App activity report, S2-23: EventExposure notification when activity is detected for a blocked application/app-type/app-component for a certain UE-ID, including: Event=App activity, UE-ID, App-ID/App-type/App component, S2-24: notification/alarm when activity is detected for a blocked application/app-type/app-component for a certain UE-ID, including: UE-ID, App-ID/App-type/App component, Indication of the App activity report It will be clear that the above is not intended to limit the invention to the specific steps and that, as will be clear to those skilled in the art, not all steps must be implemented as in this exemplary implementation. It will further be clear that the implementation of one step as described above does not necessarily require all steps as being implemented as above.

Thus, FIGS. 2*a* and 2*b* describe a plurality of aspects of the invention, and their interactions. However, the invention is not limited thereto and specific embodiments will be described in the following. In the following reference will be made to various steps, using the same reference numerals as above. It is thus clear that, for any given step, in addition or as a replacement to the description indicated in the following, which is to be intended as a possible configuration for the step to be implemented in the respective embodiment, further characteristics of the given step can be gathered from the previous description.

As visible in FIG. 4, an embodiment of the invention can relate to a method for operating a network exposure entity 270 in a cellular network 200, the cellular network 200 being operable to transmit at least a data packet session of a first application between a user equipment 210 and a content provider. The method can comprise a step S2-1 of receiving, from an application entity 280 configured to block the use of the first application on the user equipment, a first blocking request for blocking use of the first application at the user equipment, the first blocking request comprising an identifier of the user equipment 210, and an identifier of the first application. Furthermore, the method can comprise a step S2-2, S2-4, of transmitting to other entities of the cellular network 200, a message informing the other entities of the blocking of the first application, the message comprising the identifier of the user equipment 210, and the identifier of the first application.

In some embodiments, the step S2-2, S2-4 of transmitting the message to other entities of the cellular network 200 can comprise a step S2-2 of transmitting, to a subscriber database 260 of the cellular network 200, an updating request for updating data related to a subscription of the user equipment 210, the updating request comprising the identifier of the user equipment 210, and the identifier of the first application.

In some embodiments, the step S2-2, S2-4 of transmitting the message to other entities of the cellular network 200 can comprise a step S2-4 of transmitting, to a policy control entity 250 of the cellular network 200, a second blocking request for blocking use of the first application at the user equipment, the second blocking request comprising the identifier of the user equipment 210, and the identifier of the first application.

In some embodiments, the method can further comprise a step S2-14 of transmitting, to a session control entity 240 of the cellular network 200, a blocking subscription for requesting the session control entity 240 to provide notifications concerning blocking of data between the first application and the content provider.

In some embodiments, the method can further comprise a step S2-23 of receiving, from the session control entity 240, a second data report for notifying blocking of data between the first application and the content provider, and a step S2-24 of transmitting, to the application entity 280, a third data report for notifying blocking of data between the first application and the content provider, based on the second data report.

As visible in FIG. 5, an embodiment of the invention can relate to a method for operating a policy control entity 250 in a cellular network 200, the cellular network 200 being operable to transmit at least a data packet session of a first application between a user equipment 210 and a content provider. The method can comprise a step S2-4 of receiving, from a network exposure entity 270 of the cellular network, a second blocking request for blocking use of the first application at the user equipment, the second blocking request comprising an identifier of the user equipment 210, and an identifier of the first application. Moreover, the method can comprise a step S2-5 of checking whether the user equipment 210 is connected to the cellular network 200 and a step S2-6 of transmitting, to an access management entity 220 of the cellular network, a third blocking request for blocking use of the first application at the user equipment, based on the outcome of the checking step S2-5, the third blocking request comprising the identifier of the user equipment, and the identifier of the first application.

In some embodiments, the method can further comprise a step S2-9 of transmitting, to a session control entity 240 of the cellular network, a fifth blocking request requesting the session control entity 240 to block data between the first application and the user equipment, the blocking request comprising the identifier of the user equipment and the identifier of the first application.

As visible in FIG. 6, an embodiment of the invention can relate to a method for operating a user plane entity 230 in a cellular network 200, the cellular network 200 being operable to transmit at least a data packet session of a first application between a user equipment 210 and a content provider. The method can comprise a step S2-20 of detecting data between the first application and the content provider, a step S2-21 of blocking the data between the first application and the content provider, and a step S2-22 of transmitting, to a session control entity 240 of the cellular network, a first data report for notifying blocking of data exchanged with the first application.

In some embodiments, the method can further comprise a step S2-10 of receiving, from the session control entity 240, a session modification request for blocking data between the first application and the content provider, the session modification request comprising an identifier of the user equipment 210, and an identifier of the first application. Additionally, the method can comprise a step S2-11 of transmitting, to the session control entity 240, a session modification confirmation, in response to the session modification request.

As visible in FIG. 7, an embodiment of the invention can relate to a method for operating a user equipment 210 connectable to a cellular network 200, the cellular network 200 being operable to transmit at least a data packet session of a first application between a user equipment 210 and a content provider. The method can comprise a step S2-7 of receiving, from the cellular network 200, a fourth blocking request for blocking use of the first application, the fourth blocking request comprising an identifier of the first application. Moreover, the method can comprise a step S2-8 of blocking the first application identified by the identifier, based on the fourth blocking request.

FIGS. 3a and 3b shows example flowcharts of methods for operating various entities of a cellular network 300. In particular the method allows the blocking of a first application in a user equipment 310.

It will be understood that while FIGS. 3a and 3b illustrate a plurality of entities and steps, not all of those entities and steps are necessary for implementing the invention. FIGS. 3a and 3b will be described first in their entirety, so as to allow a better understanding of how the various embodiments might cooperate together. Specific embodiments of the invention will then be described, with reference to some of the entities and steps of FIGS. 3a and 3b. It will further be understood that, in some embodiments, the user equipment 310 might be a further implementation of the user equipment 210, the access management entity 320 might be a further implementation of the access management entity 220, the user plane entity 330 might be a further implementation of the user plane entity 230, the session control entity 340 might be a further implementation of the session control entity 240, the policy control entity 350 might be a further implementation of the policy control entity 250, the subscriber database 360 might be a further implementation of the subscriber database 260, the network exposure entity 370 might be a further implementation of the network exposure entity 270, the application entity 380 might be a further implementation of the application entity 280.

At step S3-1, a first session establishment request is transmitted from the user equipment 310 to the access management entity 320. The general purpose of this step is to allow the user equipment 310 to request the network 300 to establish a session for the user equipment 310, so that the user equipment 310 can communicate through the network. In some embodiments, the first session establishment request can comprise an identifier of the user equipment 310.

At step S3-2, the access management entity 320 transmits a second establishment request to the session control entity 340. At step S3-3, the session control entity 340 transmits a first policies request to the policy control entity, so as to obtain policies applicable to the session of user equipment 310. At step S3-4, the policy control entity 350 transmits a second policies request to the subscriber database 360. The second establishment request and the first and second policy request might also comprise the identifier of the user terminal.

As described above with reference to step S2-2 details related to the blocking request, for instance one or more of the elements previously described as content of the first blocking request of step S2-1 can be saved in the subscriber database 360. This allows the subscriber database 360 to respond to the second policy request, at step S3-5, by transmitting a first policies message. This message can comprise details allowing the network to identify applications which had been previously been requested to be blocked on the user equipment 310. In particular, the first policies message can comprise any of the details previously described as content of the first blocking request of step S2-1, such as the App-ID, or App-type, etc. At step S3-6, the policy control entity 350 transmits a second policy message to the session control entity 340, in response to the first policies request. The second policy message can comprise any of the details of the first policies request.

At step S3-7, the session control entity 340 transmits a third session establishment request to the user plane entity 330. At step S3-8 a first session establishment response is transmitted from the user plane entity 330 to the session control entity 340 in response to step S3-7, acknowledging the establishment of a new session. The messages of steps S3-7 and S3-8 can comprise the same details of steps S2-10 and S2-11, previously described, except that in this case they are intended for a session establishment instead of a session modification.

At step S3-9 the session control entity 340 transmits a second session establishment response to the access management entity 320. At step S3-10 the access management entity 320 transmits a third session establishment response to the user equipment 310. The second and third session establishment response can comprise details concerning the first application to be blocked on the user equipment, for instance any of the details previously described for the first blocking request, in addition to any details allowing the user equipment 310 to interact with the PDU session established on the network 300.

At step S3-11, in a manner similar to step S2-8 previously described, the user equipment 310 blocks use of the applications thanks to the information received in the third establishment request.

As it can be seen, the invention can allow one or more first applications to be blocked on the user equipment 310 even if, for some reasons, the user equipment 310 was not blocking those applications following a previous shut-down or an attempted tampering. In particular, thanks to the steps described above, at the establishment of a new session, the network 300 can ensure that the previously stored details on which applications are to be blocked can be implemented on the user equipment. Moreover, in case the user equipment 210 was not connected to the network at the time of the execution of the method of FIGS. 2a and 2b, thus rendering step S2-8 not possible, for instance thanks to step S2-5, the blocking can be executed on the user equipment at step S3-11.

Steps S3-12 to S3-19 substantially correspond to steps S2-18 to S2-24, so that reference is made to the previous description.

One possible, exemplary, embodiment of the messages exchanged in the method according to FIGS. 3a and 3b, written in pseudo-code, can for instance be formalized as:
- S3-1: session establishment request including UE-ID,
- S3-2: session establishment request including the UE-ID,
- S3-3: getting policies for UE-ID,
- S3-4: retrieving subscription data for the UE-ID,
- S3-5: subscription data including application blocking information for the UE-ID, i.e. for each blocked application, App-ID and/or App-type, App-component, Time,
- S3-6: policy response message, including application blocking information for the UE-ID, i.e. for each blocked application, App-ID and/or App-type, App-component, Time,
- S3-7: session establishment message, including application blocking information: UE-ID, or PFCP session ID if the user equipment 210 is identified using this identifier, PDR including the App-ID and/or App-type or App-component and the corresponding traffic filters, PDI, Packet Detection Information in PFCP, to classify the traffic accordingly into the App-ID, or App-type or App-component traffic classes, QER including the application block indication and the blocking time, URR including the indication to report application activity
- S3-8: acknowledging session modification,
- S3-9: PDU session establishment response message comprising application blocking information for the UE-ID, i.e. for each blocked application, App-ID and/or App-type, App-component, Time,
- S3-10: PDU session establishment response message comprising application blocking information for the UE-ID, i.e. for each blocked application, App-ID and/or App-type, App-component, Time,
- S3-11: blocking execution of the indicated applications during the indicated time,
- S3-12: application blocking fails in the user equipment 210 or the user equipment 210 is hacked,
- S3-13: blocked application sends UL traffic,
- S3-14: blocked application server tries to send information to the blocked application in the user equipment 210,
- S3-15. detecting traffic of blocked application,
- S3-16: blocking, at user plane entity 230, traffic to/from the blocked application
- S3-17: PFCP report message indicating the detection of activity of a blocked application, including: UE-ID, App-ID/App-type/App component, Indication of the App activity report,
- S3-18: EventExposure notification when activity is detected for a blocked application/app-type/app-component for a certain UE-ID, including: Event=App activity, UE-ID, App-ID/App-type/App component,
- S3-19: notification/alarm when activity is detected for a blocked application/app-type/app-component for a certain UE-ID, including: UE-ID, App-ID/App-type/App component, Indication of the App activity report.

It will be clear that the above is not intended to limit the invention to the specific steps and that, as will be clear to those skilled in the art, not all steps must be implemented as in this exemplary implementation. It will further be clear that the implementation of one step as described above does not necessarily require all steps as being implemented as above.

Thus, FIGS. 3a and 3b describe a plurality of aspects of the invention, and their interactions. However, the invention is not limited thereto and specific embodiments will be described in the following. In the following reference will be made to various steps, using the same reference numerals as above. It is thus clear that, for any given step, in addition or as a replacement to the description indicated in the following, which is to be intended as a possible configuration for the step to be implemented in the respective embodiment, further characteristics of the given step can be gathered from the previous description.

As visible in FIG. 8, an embodiment of the invention can relate to a method for operating a user equipment 310 connectable to a cellular network 300, the cellular network 300 being operable to transmit at least a data packet session of a first application between a user equipment 310 and a content provider. The method can comprise a step S3-1 of transmitting, to the cellular network 300, a first session establishment request for establishing a session for the user equipment 310 on the cellular network 300, a step S3-10 of receiving, from the cellular network 300, a third session establishment response, the third session establishment response comprising an identifier of the first application, and a step S3-11 of blocking the first application identified by the identifier.

As visible in FIG. 9, an embodiment of the invention can relate to a method for operating a session control entity 340 in a cellular network 300, the cellular network 300 being operable to transmit at least a data packet session of a first application between a user equipment 310 and a content provider. The method can comprise a step S3-2 of receiving, from an access management entity 320 of the cellular network 300, a second session establishment request for establishing a session for the user equipment 310 on the cellular network 300. The method can further comprise a step S3-3 of transmitting, to a policy control entity 350 of the cellular network 300, a first policies request for obtaining policies applicable to the session, and a step S3-6 of receiving, from the policy control entity 350, a second policies message, in response to the first policies request, the second policies message comprising an identifier of the first application. The method can also further comprise a step S3-9 of transmitting, to the access management entity 320, a second session establishment response, in response to the second session establishment request, the second session establishment response comprising the identifier of the first application.

In some embodiments, the method can further comprise a step S3-7 of transmitting, to a user plane entity 330 of the cellular network 300, a third session establishment request for establishing a session for the user equipment 310 on the cellular network 300, the third session establishment request comprising the identifier of the first application, and a step S3-8 of receiving, from the user plane entity 330, a first session establishment response, in response to the third session establishment request.

As visible in FIG. 10, an embodiment of the invention can relate to a method for method for operating a user plane entity 330 in a cellular network 300, the cellular network 300 being operable to transmit at least a data packet session of a first application between a user equipment 310 and a content provider. The method can comprise a step S3-20 of detecting data between the first application and the content provider, a step S3-21 of blocking data between the first application and the content provider, and a step S3-22 of transmitting, to a session control entity 340 of the cellular network 300, a first data report for notifying blocking of data between the first application and the content provider, based on the step of detecting S3-20 and/or on the step of blocking S3-21.

In some embodiments, the method can further comprise a step S3-7 of receiving, from the session control entity 340, a third session establishment request for establishing a session for the user equipment 310 on the cellular network 300, the third session establishment request comprising an identifier of the first application, and a step S3-8 of transmitting, to the session control entity 340, a first session establishment response, in response to the third session establishment request.

Although the methods above have each been described independently with reference to a Figure comprising a plurality of steps implemented by a plurality of nodes, it will be clear that the invention can be implemented by a subset of those steps, carried out by one or more nodes. Moreover, features and advantages of one step described for a given embodiment can also apply to the same step, and/or an analogous step, described for a different embodiment.

Moreover, although the description above has been discussed in terms of method steps, it will be clear that the invention can also be implemented by respective devices. In particular, FIGS. 11a to 17a respectively show an example schematic of a:

network exposure entity 270
policy control entity 250
user plane entity 230
user equipment 210
user equipment 310
session control entity 340
user plane entity 330 each comprising a processing unit, an interface and a memory. The interface or transceiver is configured to allow communication with other entities in the wireless communication network and/or outside of it. The memory can comprise instructions configured to cause the processing unit to carry out any of steps described above with reference to the respective entity.

Moreover, the respective devices for implementing the invention can be also defined in terms of modules. In particular, FIGS. 11b to 17b respectively show various modules of a:

network exposure entity 270
policy control entity 250
user plane entity 230
user equipment 210
user equipment 310
session control entity 340
user plane entity 330

The modules generally allow each entity to implement any of the steps previously described in combination with the respective entity. More specifically, FIG. 11b schematically illustrates modules M2-1, and M2-2 M2-4, configured for carrying out the functionality of step S2-1, and S2-2 S2-4, respectively. Similarly, FIG. 12b schematically illustrates modules M2-4, M2-5 and M2-6, configured for carrying out the functionality of step S2-4, S2-5 and S2-6, respectively. Similarly, FIG. 13b schematically illustrates modules M2-20, M2-21 and M2-22, configured for carrying out the functionality of step S2-20, S2-21 and S2-22, respectively. Similarly, FIG. 14b schematically illustrates modules M2-7 and M2-8, configured for carrying out the functionality of step S2-7 and S2-8, respectively. Similarly, FIG. 15b schematically illustrates modules M3-1, M3-10 and M3-11, configured for carrying out the functionality of step S3-1, S3-10 and S3-11, respectively. Similarly, FIG. 16b schematically illustrates modules M3-2, M3-3, M3-6 and M3-9, configured for carrying out the functionality of step S3-2, S3-3, S3-6 and S3-9, respectively. Similarly, FIG. 17b schematically illustrates modules M3-20, M3-21 and M3-22, configured for carrying out the functionality of step S3-20, S3-21 and S3-22, respectively.

It will be clear that any of those entities can further comprise a module implementation of the other steps previously described.

In particular, in some embodiments, the session control entity 22 can further comprise modules M2-6 and M2-7, configured for carrying out the functionality of step S2-6 and S2-7, respectively, as illustrated in dashed lines in FIG. 15 to indicate that those modules are optional the session control entity 22.

It will be further clear that any of those entities can further comprise additional module implementations, not illustrated, of the other steps previously described.

Additionally, an embodiment can relate to a system comprising at least two entities selected from any of the entities described above, and in particular among the network exposure entity 270, the policy control entity 250, the user plane entity 230, 330, the user equipment 210, 310 and the session control entity 340.

As it results evident from the above, the various embodiments of the invention allow a solution for blocking applications on a user equipment which is network driven. Thanks to the invention, the blocking of the application does not require interaction of the user nor physical access to the user equipment, neither for configuring the operating system or installing application blocking software, as it is the case in the prior art. The invention further allows an improved security since user does not have the possibility of reconfiguring the user equipment operating system or uninstall/deactivate the blocking. Even if the user somehow manages to remove the blocking from the user equipment, or in case of a malfunctioning, or if the user equipment does not support the blocking, the network can block the traffic to and/or from the application, thus effectively blocking usability of the application on the user equipment. Such data blocking can be further notified to third party, thus informing the third party of the potential security breach and, more generally, of the fact that traffic related to the application has been blocked.

The invention claimed is:

1. A method for operating a network exposure entity in a cellular network, the cellular network being operable to transmit at least a data packet session of a first application between a user equipment and a content provider, the method comprising:
    receiving, from an application entity configured to block the use of the first application on the user equipment, a first blocking request for blocking use of the first application at the user equipment, the first blocking request comprising:
        an identifier of the user equipment; and
        an identifier of the first application; and
    transmitting, to other entities of the cellular network, a message informing the other entities of the blocking of the first application, the message comprising:
        the identifier of the user equipment; and
        the identifier of the first application.

2. The method according to claim 1, wherein transmitting the message to other entities of the cellular network comprises:
    transmitting, to a subscriber database of the cellular network, an updating request for updating data related to a subscription of the user equipment, the updating request comprising:
        the identifier of the user equipment; and
        the identifier of the first application.

3. The method according to claim 2, wherein transmitting the message to other entities of the cellular network comprises:
    transmitting, to a policy control entity of the cellular network, a second blocking request for blocking use of the first application at the user equipment, the second blocking request comprising:
        the identifier of the user equipment; and
        the identifier of the first application.

4. The method according to claim 2, further comprising:
    transmitting, to a session control entity of the cellular network, a blocking subscription for requesting the session control entity to provide notifications concerning blocking of data between the first application and the content provider.

5. The method according to claim 4 further comprising:
    receiving, from the session control entity, a second data report for notifying blocking of data between the first application and the content provider; and
    transmitting, to the application entity, a third data report for notifying blocking of data between the first application and the content provider, based on the second data report.

6. The method according to claim 1, wherein transmitting the message to other entities of the cellular network comprises:
    transmitting, to a policy control entity of the cellular network, a second blocking request for blocking use of the first application at the user equipment, the second blocking request comprising:
        the identifier of the user equipment; and
        the identifier of the first application.

7. The method according to claim 6, further comprising:
    transmitting, to a session control entity of the cellular network, a blocking subscription for requesting the session control entity to provide notifications concerning blocking of data between the first application and the content provider.

8. The method according to claim 7, further comprising:
    receiving, from the session control entity, a second data report for notifying blocking of data between the first application and the content provider; and
    transmitting, to the application entity, a third data report for notifying blocking of data between the first application and the content provider, based on the second data report.

9. The method according to claim 1, further comprising:
    transmitting, to a session control entity of the cellular network, a blocking subscription for requesting the session control entity to provide notifications concerning blocking of data between the first application and the content provider.

10. The method according to claim 9, further comprising:
    receiving, from the session control entity, a second data report for notifying blocking of data between the first application and the content provider; and
    transmitting, to the application entity, a third data report for notifying blocking of data between the first application and the content provider, based on the second data report.

11. A method for operating a policy control entity in a cellular network, the cellular network being operable to transmit at least a data packet session of a first application between a user equipment and a content provider, the method comprising:
    receiving, from a network exposure entity of the cellular network, a second blocking request for blocking use of the first application at the user equipment, the second blocking request comprising:
        an identifier of the user equipment; and
        an identifier of the first application;
    checking whether the user equipment is connected to the cellular network; and
    transmitting, to an access management entity of the cellular network, a third blocking request for blocking use of the first application at the user equipment, based on the outcome of the checking step, the third blocking request comprising:
        the identifier of the user equipment; and
        the identifier of the first application.

12. The method according to claim 11, further comprising:
    transmitting, to a session control entity of the cellular network, a fifth blocking request requesting the session control entity to block data between the first application and the user equipment, the blocking request comprising the identifier of the user equipment and the identifier of the first application.

13. A network exposure entity for a cellular network, the cellular network being operable to transmit at least a data packet session of a first application between a user equipment and a content provider, the network exposure entity comprising:
    a processing unit and a memory, the memory comprising instructions configured to cause the processing unit to:

receive, from an application entity configured to block the use of the first application on the user equipment, a first blocking request for blocking use of the first application at the user equipment, the first blocking request comprising:
an identifier of the user equipment; and
an identifier of the first application; and
transmit, to other entities of the cellular network, a message informing the other entities of the blocking of the first application, the message comprising:
the identifier of the user equipment; and
the identifier of the first application.

14. The network exposure entity according to claim 13, wherein transmitting the message to other entities of the cellular network comprises:
transmitting, to a subscriber database of the cellular network, an updating request for updating data related to a subscription of the user equipment, the updating request comprising:
the identifier of the user equipment; and
the identifier of the first application.

15. The network exposure entity according to claim 14, wherein transmitting the message to other entities of the cellular network comprises:
transmitting, to a policy control entity of the cellular network, a second blocking request for blocking use of the first application at the user equipment, the second blocking request comprising:
the identifier of the user equipment); and
the identifier of the first application.

16. The network exposure entity according to claim 14, the memory further comprising instructions configured to cause the processing unit to:
transmit, to a session control entity of the cellular network, a blocking subscription for requesting the session control entity to provide notifications concerning blocking of data between the first application and the content provider.

17. The network exposure entity according to claim 16, the memory further comprising instructions configured to cause the processing unit to:
receive, from the session control entity, a second data report for notifying blocking of data between the first application and the content provider; and
transmit, to the application entity, a third data report for notifying blocking of data between the first application and the content provider, based on the second data report.

18. The network exposure entity according to claim 13, wherein transmitting the message to other entities of the cellular network comprises:
transmitting, to a policy control entity of the cellular network, a second blocking request for blocking use of the first application at the user equipment, the second blocking request comprising:
the identifier of the user equipment; and
the identifier of the first application.

19. The network exposure entity according to any of claims claim 13, the memory further comprising instructions configured to cause the processing unit to:
transmit, to a session control entity of the cellular network, a blocking subscription for requesting the session control entity to provide notifications concerning blocking of data between the first application and the content provider.

20. The network exposure entity according to claim 19, the memory further comprising instructions configured to cause the processing unit to:
receive, from the session control entity, a second data report for notifying blocking of data between the first application and the content provider; and
transmit, to the application entity, a third data report for notifying blocking of data between the first application and the content provider, based on the second data report.

* * * * *